(12) United States Patent
Kim

(10) Patent No.: US 9,477,357 B2
(45) Date of Patent: Oct. 25, 2016

(54) TOUCH INPUT SYSTEM AND METHOD FOR DETECTING TOUCH USING THE SAME

(71) Applicant: LG DISPLAY CO., LTD., Seoul (KR)

(72) Inventor: Ha-Zoong Kim, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 32 days.

(21) Appl. No.: 14/132,888

(22) Filed: Dec. 18, 2013

(65) Prior Publication Data

US 2014/0320445 A1 Oct. 30, 2014

(30) Foreign Application Priority Data

Apr. 30, 2013 (KR) .................. 10-2013-0048725

(51) Int. Cl.
| | |
|---|---|
| G06F 3/045 | (2006.01) |
| G06F 3/044 | (2006.01) |
| G06F 3/0354 | (2013.01) |
| G06F 3/041 | (2006.01) |
| G06F 3/046 | (2006.01) |

(52) U.S. Cl.
CPC .......... *G06F 3/044* (2013.01); *G06F 3/03545* (2013.01); *G06F 3/046* (2013.01); *G06F 3/0416* (2013.01); *G06F 2203/04106* (2013.01)

(58) Field of Classification Search
CPC .... G06F 3/044; G06F 3/03545; G06F 3/046; G06F 3/0416; G06F 2203/04106
USPC .......... 345/173–174, 179; 178/18.01, 18.03, 178/18.06, 18.07, 19.01, 19.03
See application file for complete search history.

(56) References Cited

U.S. PATENT DOCUMENTS

| | | |
|---|---|---|
| 5,693,914 A | 12/1997 | Ogawa |
| 2004/0095333 A1 | 5/2004 | Morag et al. |
| 2004/0155871 A1 | 8/2004 | Perski et al. |
| 2007/0242056 A1 | 10/2007 | Engelhardt et al. |
| 2008/0149401 A1 | 6/2008 | Hagen et al. |
| 2008/0150916 A1* | 6/2008 | Vos ..................... G06F 3/03545 345/179 |
| 2008/0150917 A1* | 6/2008 | Libbey et al. ................ 345/179 |
| 2008/0156546 A1 | 7/2008 | Hauck |
| 2008/0238885 A1 | 10/2008 | Zachut et al. |
| 2009/0078476 A1 | 3/2009 | Rimon et al. |
| 2011/0084918 A1* | 4/2011 | Sung ............................ 345/173 |
| 2012/0068964 A1 | 3/2012 | Wright et al. |

(Continued)

FOREIGN PATENT DOCUMENTS

| | | |
|---|---|---|
| CN | 102576274 A | 7/2012 |
| JP | 2008-152640 A | 7/2008 |
| JP | 2008-529414 A | 7/2008 |

(Continued)

*Primary Examiner* — Rodney Amadiz
(74) *Attorney, Agent, or Firm* — Dentons US LLP

(57) ABSTRACT

A touch input system and a touch detection method using the same are disclosed. With the disclosed touch input system, the size and manufacturing costs of the stylus are reduced while finger touch and touch of stylus without a battery are distinguished and detected. The touch input system includes a sensor panel including a plurality of first channels and a plurality of second channels, crossing each other, a stylus including one or a plurality of primary coils connected in series to each other, a resonance capacitor connected in parallel to the primary coil, and a conductive tip connected to the primary coil, a ground connected to the stylus, an antenna loop formed outside an edge of the sensor panel, and a touch controller connected to the first channel, the second channel, and the antenna loop.

10 Claims, 22 Drawing Sheets

(56) References Cited

U.S. PATENT DOCUMENTS

2014/0062898 A1* 3/2014 Singh et al. .................. 345/173
2014/0104224 A1* 4/2014 Ih ........................... G06F 3/044
                                                    345/174

FOREIGN PATENT DOCUMENTS

| JP | 2010-086542 A | 4/2010 |
| TW | 201407427 A | 2/2014 |
| WO | 2006083567 A1 | 8/2006 |

* cited by examiner

TOUCH INPUT SYSTEM AND METHOD FOR DETECTING TOUCH USING THE SAME

CROSS-REFERENCE TO RELATED APPLICATIONS

The present invention claims the benefit of Korean Patent Application No. 10-2013-0048725, filed on Apr. 30, 2013, which is hereby incorporated by reference for all purposes as if fully set forth herein.

BACKGROUND OF THE INVENTION

1. Field of the Invention

The present invention relates to a touch input system and a touch detection method using the same, by which the size and manufacturing costs of the stylus are reduced while finger touch and touch of stylus without a battery are distinguished and detected.

2. Discussion of the Related Art

With the advent of an increased information age, a display field for visually expressing electrical information signals has rapidly developed. To meet this trend, various flat display devices having excellent performance characteristics, i.e., miniaturized, lightweight, and low power consumption, have been developed.

Examples of flat display devices may include liquid crystal display devices, plasma display panel devices, field emission display devices (FEDs), organic light emitting diode display devices, etc.

In accordance with current trends, a touch panel for recognizing a touch portion via a human hand or a separate input unit and transmitting separate information corresponding to the touch has been added to a flat display device. Currently, the touch panel is added to an external surface of the display device. In addition, according to a touch detection manner, the touch panel is classified into a resistive touch panel, a capacitive panel, an infrared touch panel, etc. Recently, in consideration of convenience of a manufacturing method, detection capability, etc., capacitive panels have attracted attention.

In accordance with current trends, a smart phone, a smart book, etc. as the most compelling mobile device have used a stylus that can write or draw a picture via a pen as well as a touch input using a finger, as a human interface device (HID). Stylus input is advantageous in that more detailed input is possible than with a finger and detailed drawing and writing functions are supported.

Hereinafter, a general capacitive touch screen will be described with reference to the appended drawings.

FIG. 1 is a circuit diagram of a touch detection circuit of a general capacitive touch screen. FIG. 2 is a graph illustrating voltage output based on time according to presence of finger touch using the circuit diagram of FIG. 1.

As illustrated in FIG. 1, the touch detection circuit of the general capacitive touch screen includes a first electrode Tx and a second electrode Rx that intersect, an amplifier 5 that receives output of the second electrode Rx via a negative (−) input terminal and receives a reference voltage Vref via a positive (+) input terminal, and a capacitor Cs formed between an output terminal of the amplifier 5 and the negative (−) input terminal.

Here, the first electrode Tx receives an input voltage Vin through a pad formed at one end thereof and senses an output voltage Vout output through the amplifier 5 via a pad formed at one end of the second electrode Rx.

In general, a touch drive signal of a square wave of about 2 to 3 μs as an input voltage is applied to the first electrode Tx. In this case, a voltage proportional to mutual capacitance ΔCm between the first and second electrodes Tx and Rx is sensed as the output voltage Vout.

As illustrated in FIG. 2, when the square wave is applied as the input voltage, the output voltage Vout increases over time (when finger touch is not present). In this regard, when finger touch is present, the finger comes into contact with an electrode such that mutual capacitance variation ΔCm is reduced, and thus, an amount of increase in the output voltage Vout is reduced. The reduction amount is obtained from an intersection between a Tx channel and an Rx channel to calculate data, and coordinates of finger touch portion may be extracted from the data.

However, when the touch detection circuit of FIG. 1 is used for stylus touch instead of finger touch, since a contact area between a tip of the stylus and a sensor panel surface is relatively small, mutual capacitance variation ΔCm between electrodes is small, and thus, it is difficult to sense a change in mutual capacitance during the stylus touch. Thus, accuracy of coordinate extraction is reduced.

When the tip of the stylus is small compared with an electrode formed on the sensor panel for sensing, coordinate distortion occurs according to presence of an electrode, thereby directly affecting sensitivity.

In addition, in cases of the finger touch and the stylus touch using the same touch detection circuit, when touch is input via the stylus, problems arise in that a palm touch and the stylus touch on the electrode cannot be distinguished. That is, it is difficult to provide a palm rejection function during stylus touch to the detection circuit of FIG. 1.

Although a method of driving the stylus touch using a different method, e.g., an electromagnetic driving method from the finger touch has been introduced, in this case, a separate panel for detection via electromagnetic driving is further required in addition to the capacitive electrode, thereby increasing the number of components and manufacturing processes.

SUMMARY OF THE INVENTION

Accordingly, the present invention is directed to a touch input system and a method for detecting touch using the same that substantially obviate one or more problems due to limitations and disadvantages of the related art.

An object of the present invention is to provide a touch input system and a touch detection method using the same, by which a stylus is implemented without a battery and the size and manufacturing costs of the stylus are reduced while stylus touch and finger touch are distinguished and detected.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch input system includes a sensor panel including a plurality of first channels and a plurality of second channels crossing each other, a stylus including one or a plurality of primary coils connected in series to each other, a resonance capacitor connected in parallel to the primary coil, and a conductive tip connected to the primary coil, a ground connected to the stylus, an antenna loop formed outside an edge of the sensor panel, and a touch controller connected to the plurality of first channels, the plurality of second channels, and the antenna loop.

The primary coil may be wound about a magnetic core connected in series to the conductive tip and disposed in an axis direction of the stylus.

The stylus may include a stylus barrel having a hole through which the conductive tip partially protrudes, and a grip formed on at least one outer circumference surface of the stylus barrel and formed of a high resistance conductive material.

One end of the primary coil disposed in series to the stylus may be connected to the conductive tip, and the other end of the primary coil may be connected to the stylus barrel or the grip formed of the high resistance conductive material.

The antenna loop may receive a resonating inductance signal from the primary coil in the stylus when the stylus touches a surface of the sensor panel.

In another aspect of the present invention, a touch detection method using a touch input system including a sensor panel including a plurality of first channels and a plurality of second channels crossing each other, a stylus including one or a plurality of primary coils connected in series to each other, a resonance capacitor connected in parallel to the primary coil, and a conductive tip connected to the primary coil, a ground connected to the stylus, and an antenna loop formed outside an edge of the sensor panel, includes time-division for performing finger touch sensing and stylus touch sensing per frame.

The stylus touch sensing may include sequentially applying signals to the plurality of first channels and the plurality of second channels and detecting touch according to a voltage difference between two ends of the antenna channel per channel.

The detecting of the touch may include electrically connecting a sensing capacitor between the conductive tip and the sensor panel to at least one primary coil, forming a resonance circuit of the primary coil and the resonance capacitor, and receiving induced electromotive force that electromagnetically resonates in the antenna loop due to inductance of the primary coil.

The stylus may include a stylus barrel having a hole through which the conductive tip partially protrudes, and a grip formed on at least one outer circumference surface of the stylus barrel and formed of a high resistance conductive material.

The antenna loop may receive a resonating inductance signal from the primary coil in the stylus when the stylus touches a surface of the sensor panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings.

A touch input system according to the present invention can detect finger touch via a basic structure for touch detection using a capacitive method, and detect stylus touch via resonance between an internal resonance circuit of the stylus and an antenna loop formed outside the edge of the sensor panel. There is a limit in detecting stylus touch using a capacitive method, and thus, the stylus touch can be detected by changing the structure outside the edge of the sensor panel and an internal circuit of the stylus without a separate panel irrespective a contact area or shapes of electrode patterns.

Hereinafter, a structure of a capacitive electrode formed in an active region and a phenomenon of stylus touch using the capacitive electrode will be described.

Figure 1:
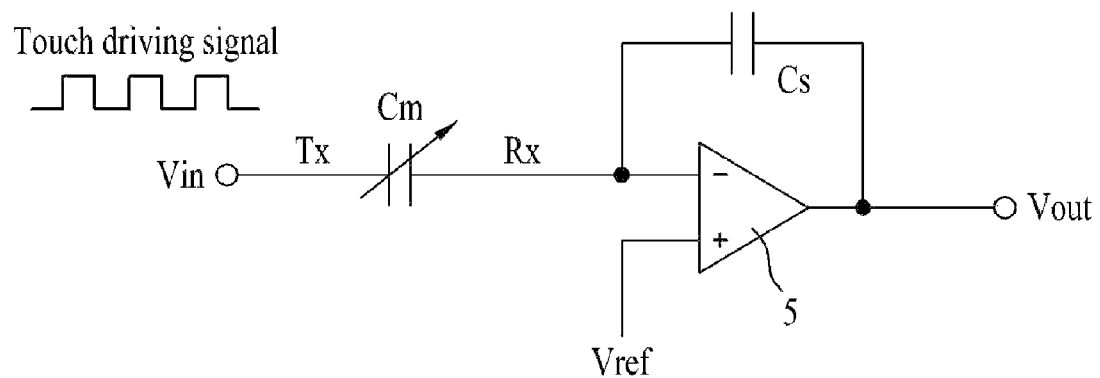
FIG. 1 is a circuit diagram of a touch detection circuit of a general capacitive touch screen.
Figure 2:
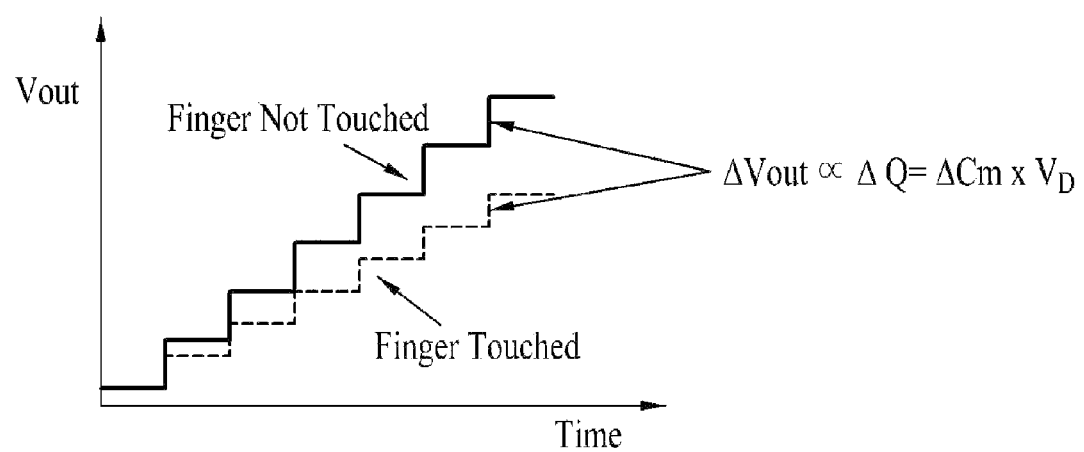
FIG. 2 is a graph illustrating voltage output based on time according to presence of finger touch using the circuit diagram of FIG. 1.
Figure 3:
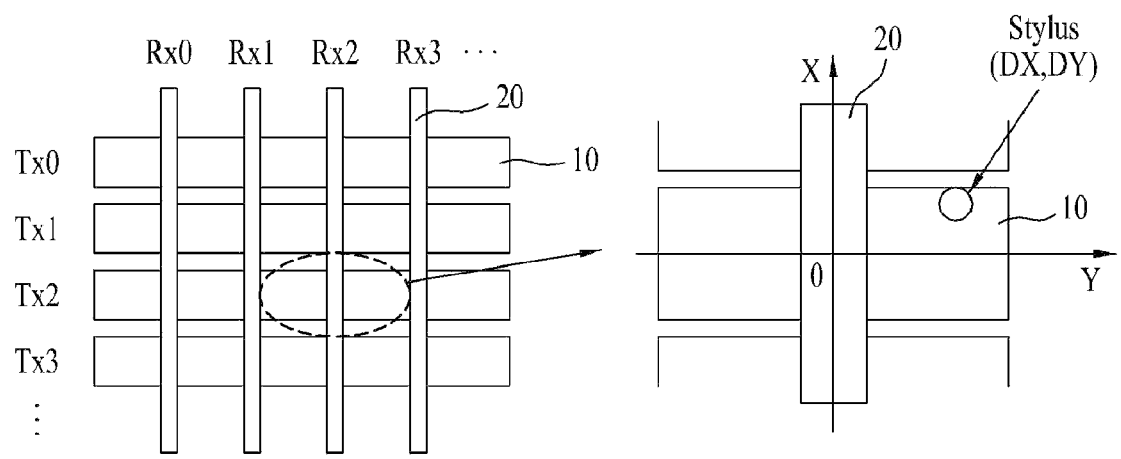
FIG. 3 is a plan view of a structure inside an active region of a touch input system according to the present invention.
Figure 4:
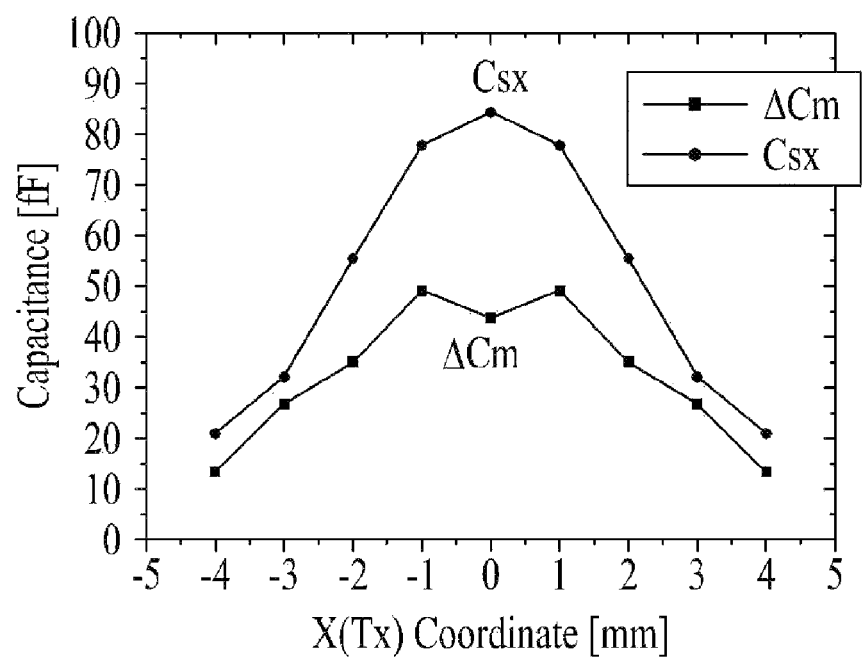
FIG. 4 is a graph illustrating capacitance Csx between a stylus and a Tx channel and mutual capacitance variation ΔCm between a Tx channel and an Rx channel according to presence of a stylus in the touch input system of FIG. 3, along the X-axis of FIG. 3.

FIG. 3 is a plan view of a structure inside an active region of a touch input system according to the present invention. FIG. 4 is a graph illustrating capacitance Csx between a stylus and a Tx channel and mutual capacitance variation $\Delta Cm$ between the Tx channel and the Rx channel according to presence of a stylus in the touch input system of FIG. 3, along the X-axis of FIG. 3.

As illustrated in FIG. 3, when the Tx channel and the Rx channel are each shaped like a bar, these electrodes are arranged to cross each other. As a random example, capacitance variation according to movement of the stylus in a region of FIG. 3 will be described with reference to FIG. 4.

To detect the capacitance variation of the graph of FIG. 4, a central point between the Tx channel and the Rx channel is determined as the origin, an axis and another axis that cross the same are defined as an X-axis and a Y-axis, respectively, based on the origin, and then, the capacitance variation is detected according to a position of the stylus. In FIG. 3, the vertical axis is an X-axis (an Rx direction) and the horizontal axis is a Y-axis. A test proceeds when a coordinate value on the Y-axis is fixed to 0 and only a coordinate value on the X-axis is changed.

Here, $\Delta Cm$ refers to mutual capacitance variation between the Tx channel and the Rx channel according to presence of the stylus, and Csx refers to capacitance distribution between the stylus and the Tx channel. It can be seen that Csx is larger than $\Delta Cm$ in a whole region, variation in Csx is increased as an X coordinate is close to 0. In addition, it can be seen that $\Delta Cm$ is reduced at origin 0 compared with adjacent regions. Thus, in order to detect the stylus touch, it is advantageous that Csx instead of $\Delta Cm$ as data is used in terms of sensitivity and position resolution.

Thus, the touch input system according to the present invention measures a position of the stylus but uses a detection method for Csx with high sensitivity.

Figure 5A:
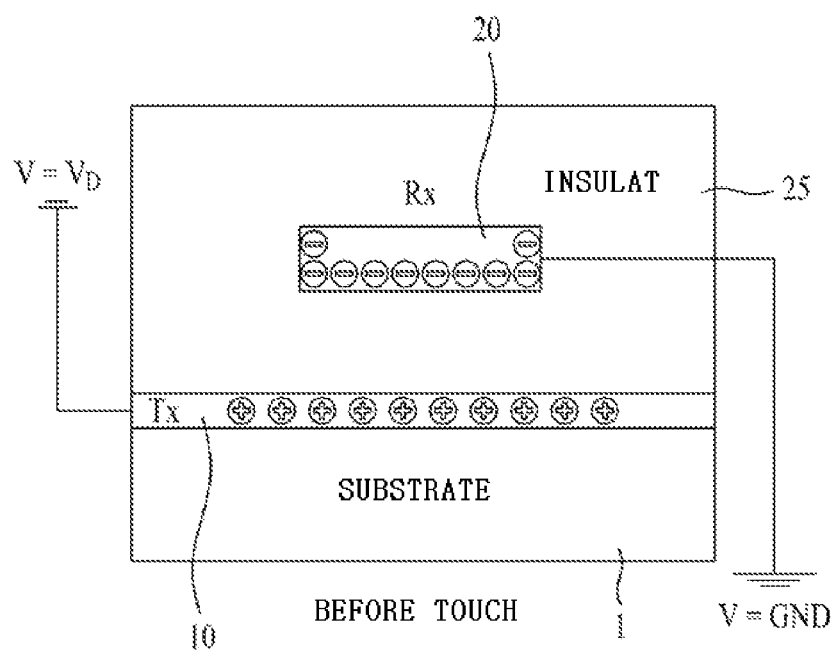
FIGS. 5A to 5C are diagrams illustrating a change in electric charge quantity in a pre-touch state, a finger touch state, and a stylus touch state.
Figure 5B:
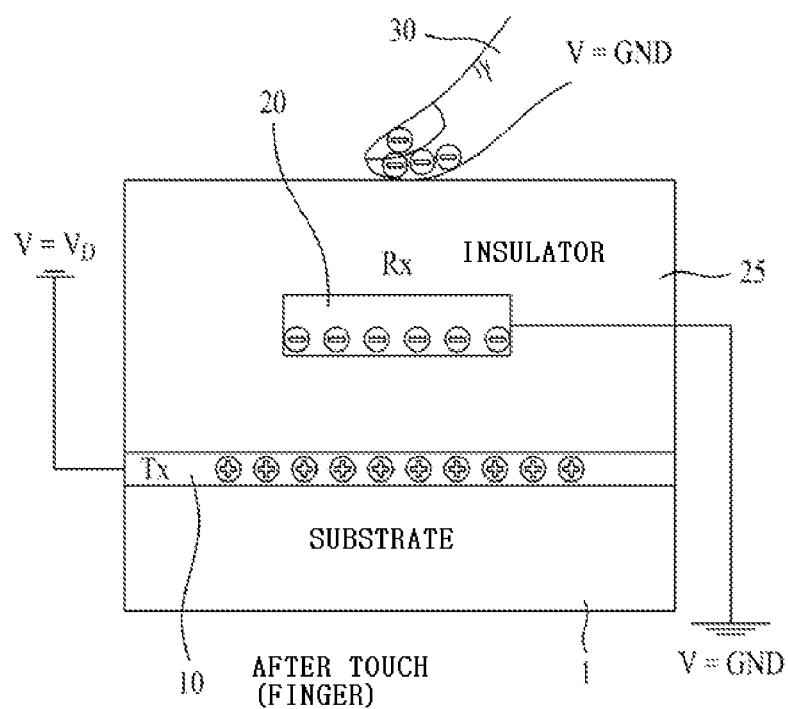
Figure 5C:
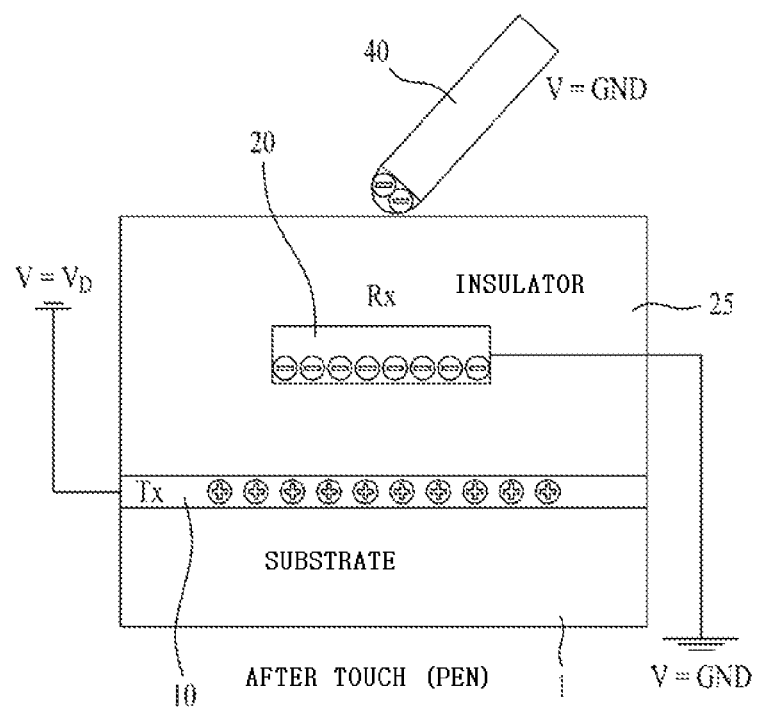

FIGS. 5A to 5C are diagrams illustrating a change in electric charge quantity in a pre-touch state, a finger touch state, and a stylus touch state.

FIGS. 5A to 5C are cross-sectional views of a case in which a Tx channel 10 and an Rx channel 20, each of which is shaped like a bar, cross each other on a substrate 1, and an insulator 25 is formed between the Tx channel 10 and the Rx channel 20 and above and around the Rx channel 20. A portion of the insulator 25, formed above and around the Rx channel 20, may be formed as in FIGS. 5A and 5C, may be omitted, or may be an air gap formed while the substrate 1 is disposed above a display.

As illustrated in FIG. 5A, when touch is not present, electric charges (Q=Cm×Vd) proportional to mutual capacitance Cm between the Tx channel and the Rx channel according to a driving voltage Vd of the Tx channel.

As illustrated in FIG. 5B, when finger touch is present, some of the electric charges induced in the Rx channel are induced by a finger, thereby reducing the quantity of the electric charges induced in the Rx channel. It can be seen that the mutual capacitance between the Tx channel and the Rx channel is reduced to Cm' from Cm due to the finger touch to obtain the reduced electric charge (Q'=Cm'×Vd). $\Delta Cm=Cm-Cm'$ may be defined and used as an indicator of touch sensitivity.

As illustrated in FIG. 5C, when stylus touch is present, if the aforementioned capacitive method is used to detect the stylus touch (in both the finger touch state and the stylus touch state, when the driving voltage Vd is applied to the Tx channel, the quantity of electric charges induced in the Rx channel is detected), since a contact area between a tip of the stylus and a sensor panel is smaller than the finger touch, the touch sensitivity $\Delta Cm$ of the stylus touch is reduced compared with the finger touch, thereby reducing the accuracy of coordinate extraction.

That is, when touch is detected in a capacitive manner using a passive type pen as a conductive input device without an internal device, problems arise in that touch sensitivity and accuracy in coordinate extraction are reduced due to a small contact area of the tip of the stylus compared with the finger.

The stylus has a problem in terms of reduction in accuracy in coordinate extraction due to a small size of a tip thereof and a palm rejection problem that arises when finger touch and stylus touch are detected using the same capacitive method. In addition, the Tx channel and the Rx channel are capacitive coupled to a display driving signal, and display noise may affect a touch sensing signal. In addition, the passive type stylus cannot transmit a separate signal to a sensor, and thus, it is difficult to implement a writing pressure detection function or a special button function.

The touch input system according to the present invention uses a capacitive sensor panel for finger touch, applies an active type stylus without a battery, and includes an antenna loop that is driven in synchronization with the stylus and formed outside an edge of the sensor panel. Hereinafter, the input system and a touch detection method using the same will be described.

Figure 6:
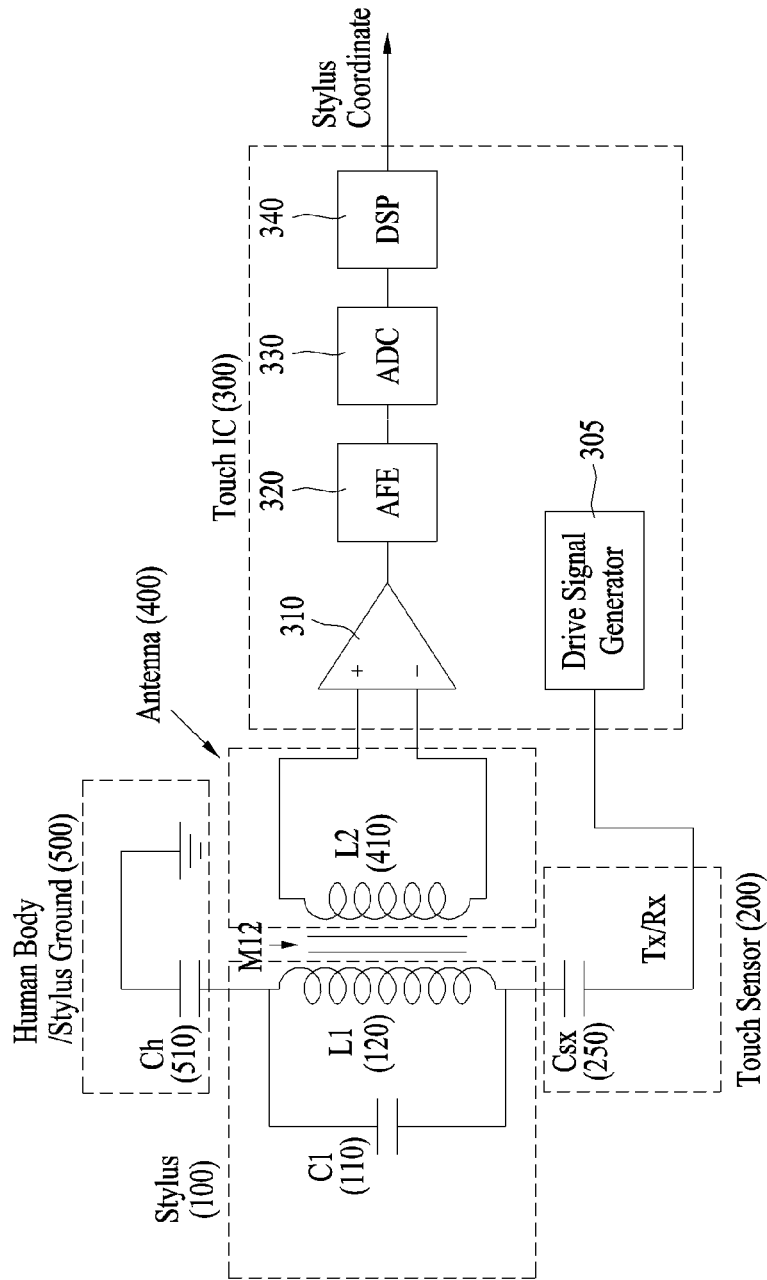
FIG. 6 is a circuit diagram of a touch input system according to the present invention.
Figure 7A:
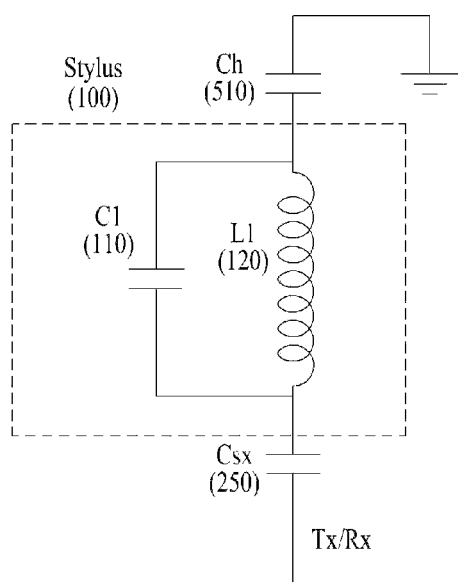
FIG. 7A is a circuit diagram corresponding to a stylus of FIG. 6.
Figure 7B:
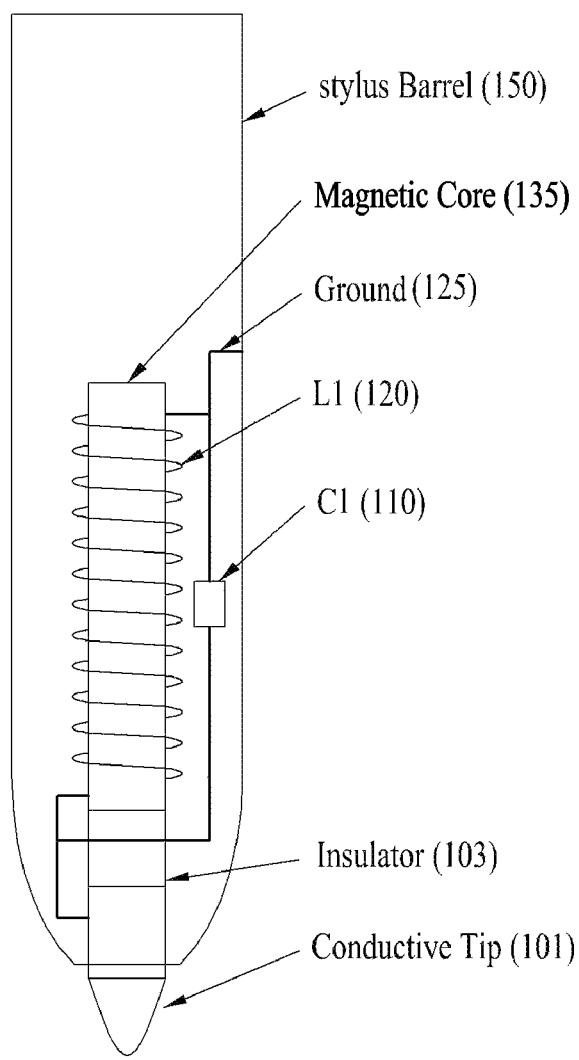
FIG. 7B is a diagram illustrating the structure of the stylus of FIG. 7A.

FIG. 6 is a circuit diagram of a touch input system according to the present invention. FIG. 7A is a circuit diagram corresponding to a stylus 100 of FIG. 6. FIG. 7B is a diagram illustrating the structure of the stylus 100 of FIG. 7A.

As illustrated in FIG. 6, the touch input system according to the present invention is largely divided into the stylus 100, a sensor panel including a touch sensor 200 and an antenna 400, a touch controller 300, and a stylus ground 500.

The touch sensor 200 includes a plurality of first channels Tx and a plurality of second channels Rx which cross each other and is disposed in an active region corresponding to a central region of the sensor panel. In addition, as the antenna 400 formed outside the edge of the active region of the sensor panel, an antenna loop 410 shaped like a loop is formed to surround an edge of the active region of the sensor panel and has two ends that are slightly spaced apart from each other.

Referring to FIGS. 7A and 7B, the stylus 100 includes one primary coil L1 120, a resonance capacitor C1 110 connected in parallel to the primary coil L1 120, and a conductive tip 101 connected to the primary coil L1 120.

One side of the primary coil L1 120 and resonance capacitor C1 110 that are connected in parallel to each other in the stylus 100 is connected to the conductive tip 101 and the other side is connected to a stylus barrel formed of a nonconductive material for formation of the stylus 100 and is grounded. In some embodiments, when a user acts as the stylus ground 500, the other side is connected to a ground capacitor Ch corresponding to a human body. That is, the stylus 100 is also connected to the stylus ground 500 to stabilize an internal circuit of the stylus 100.

The antenna loop 410 functions as a secondary coil L2 410 from a circuit point of view when the stylus 100 comes into contact with the sensor panel. In other words, the antenna loop as the secondary coil L2 410 formed outside the edge of the sensor panel, the first channel Tx, and the second channel Rx are connected to the touch controller 300 and are signal-controlled by the touch controller 300.

As a result, the antenna loop 410 receives an inductance signal of the primary coil L1 120 in the stylus 100 as mutual inductance M12 induced between the antenna loop L2 410 and the primary coil L1 120 when the stylus 100 comes into contact with a surface of the sensor panel. Here, the antenna loop 410 is formed to surround the edge of the sensor panel and includes pads formed at the two ends that are connected to the touch controller 300.

The touch controller 300 is connected to the antenna loop 410, and includes an amplifier 310 for amplifying a voltage difference between the two ends of the antenna loop 410, a filter unit (analog front end (AFE)) 320 connected to the amplifier 310 to remove noise, a converter (analog to digital converter (ADC)) 330 connected to the filter unit AFE 320 to convert an analog signal into a digital signal, a signal processor (digital signal processor (DSP)) 340 connected to the converter ADC 330 to collect digital signals to extract coordinates, and a drive signal generator 305 for generating signals applied to each channel in the sensor panel. Here, when the stylus 100 comes into contact with the touch sensor 200, the primary coil L1 120 and the resonance capacitor C1 110 constitute a closed circuit as a kind of resonance circuit.

A signal applied to each channel from the drive signal generator 305 may apply a square wave or a sine wave at the same frequency as a resonance frequency $f=1/[2\pi*(L1*C1)^{0.5}]$ in the closed circuit, wherein L1 is an inductance of the primary coil 120, and C1 is a capacitance of the resonance capacitor 110. The signal applied to each channel is a kind of alternating current (AC) voltage and each coil has a signal shape with a similar waveform to the applied signal or a signal with a waveform that increases over time.

The stylus ground 500 may be a user that contacts the stylus 100 or a wire connected between the stylus 100 and a sensor panel. Non-described reference character 'Ch' indicates a state in which the user acts as a dielectric substance such that capacitance Ch of the stylus ground 500 is generated between the stylus 100 and the stylus ground 500 when the stylus 100 contacts the user.

The primary coil L1 120 and the resonance capacitor C1 110 included in the stylus 100 are configured to have appropriate values so as to electromagnetically resonate with a frequency of a signal input through a sensing capacitor Csx 250 formed via capacitive coupling from the touch sensor 200 of the sensor panel including the first and second channels Tx/Rx that cross each other. Here, the resonance frequency satisfies the condition $f=1/[2\pi*(L1*C1)^{0.5}]$, wherein L1 is an inductance of the primary coil 120, and C1 is a capacitance of the resonance capacitor 110. In addition, the sensing capacitor Csx 250 is an imaginary element formed via capacitive coupling at a contact area when the conductive tip 101 of the stylus 100 touches the sensor panel, but not a physical device constituting the circuit.

A magnetic signal generated during electromagnetic resonance in the stylus 100 generates induced electromotive force in the secondary coil L2 410 corresponding to the antenna loop by the mutual inductance M12 between the primary coil L1 120 and the antenna loop L2 410 formed in the sensor panel. The induced electromotive force is amplified through the amplifier 310 for amplifying a voltage difference between the two ends of the antenna loop 410, passes through the filter unit AFE 320 including a filter for removal of noise, and is converted into a digital signal through the converter ADC 330. Then, coordinates are extracted from the signal through an appropriate algorithm through the signal processor DSP 340, and then, coordinate data is transmitted to a host system.

According to the present invention, since the primary coil L1 120 of the stylus 100 directly generates the induced electromotive force in the secondary coil L2 410 corresponding to an antenna coil by the mutual inductance M12 with the antenna loop L2 410, a magnetic coupling coefficient between the primary coil L1 120 and the antenna loop L2 410 may not be reduced and considered. Thus, the stylus 100 may be slimmed and manufacturing costs may be reduced.

The structure of the stylus 100 will now be described with reference to FIG. 7B. The primary coil L1 120 included in the stylus 100 is wound about a magnetic core 135 disposed in an axis direction of the stylus 100. The axis direction of the stylus 100 corresponds to a longitudinal direction of the stylus 100 and corresponds to a Z-axis of an XYZ coordinate system.

A stylus barrel 150 of the stylus 100 may include the primary coil L1 120, the resonance capacitor C1 110, and the magnetic core 135, and have a hole through which the conductive tip 101 partially protrudes. Here, the conductive tip 101 may be insulated from the stylus barrel 150. To this end, an insulating buffer may be further formed around the hole to surround the conductive tip 101. In addition, the stylus barrel 150 may be connected to the stylus ground 500. Thus, one end of the primary coil L1 120 is connected to the conductive tip 101 and the other end is connected to a ground 125 of the stylus barrel 150.

An operation of the stylus 100 configured as described above will now be described.

One end of the primary coil L1 120 is capacitive-coupled to the touch sensor 200 of the sensor panel through the conductive tip 101 to form the sensing capacitor Csx 250. Thus, an input signal from each channel of the touch sensor 200 drives a resonance circuit including the primary coil L1 120 and the resonance capacitor C1 110 through the sensing capacitor Csx 250.

The circuit is configured in such a way that signals input to the channels Tx and Rx of the touch sensor 200 from the drive signal generator 305 have the same electromagnetic resonance frequency of the resonance circuit including the primary coil L1 120 and the resonance capacitor C1 110, thereby increasing signal intensity over time due to electromagnetic resonance. In this case, the other end of the primary coil L1 120 is grounded through the ground capacitor Ch including the human body and hand that contacts the stylus barrel 150 of the stylus 100.

As described above, when the stylus 100 touches a surface of the sensor panel, the sensing capacitor Csx 250 can be generated and ground can be possible through the stylus barrel 150. In addition, a signal applied to the sensing capacitor Csx 250 is transmitted to the primary coil L1 120 through the conductive tip 101 included in the stylus 100. The primary coil L1 120 and resonance capacitor C1 110 resonate in a closed circuit state such that the amplitude of the signal increases over time. In addition, the magnetic signal of the primary coil L1 120 in the resonance circuit is induced in the antenna loop 410 by the mutual inductance M12. Sensing in the antenna loop is performed per channel.

Figure 8A:
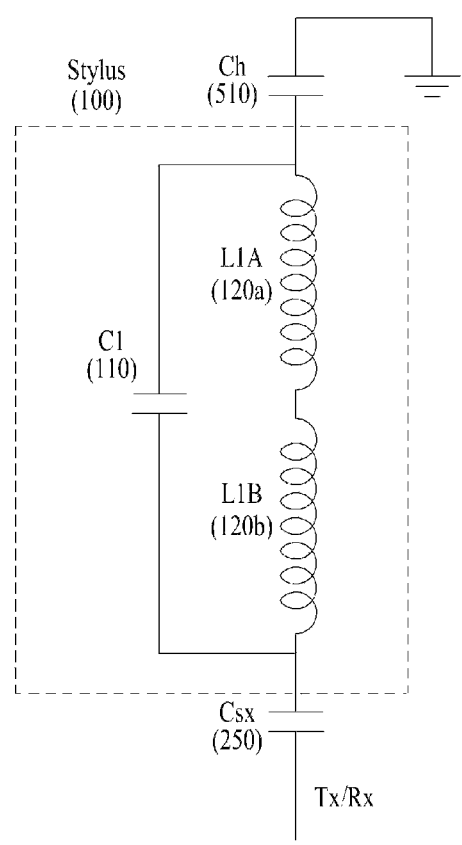
FIG. 8A is another circuit diagram corresponding to the stylus of FIG. 6.
Figure 8B:
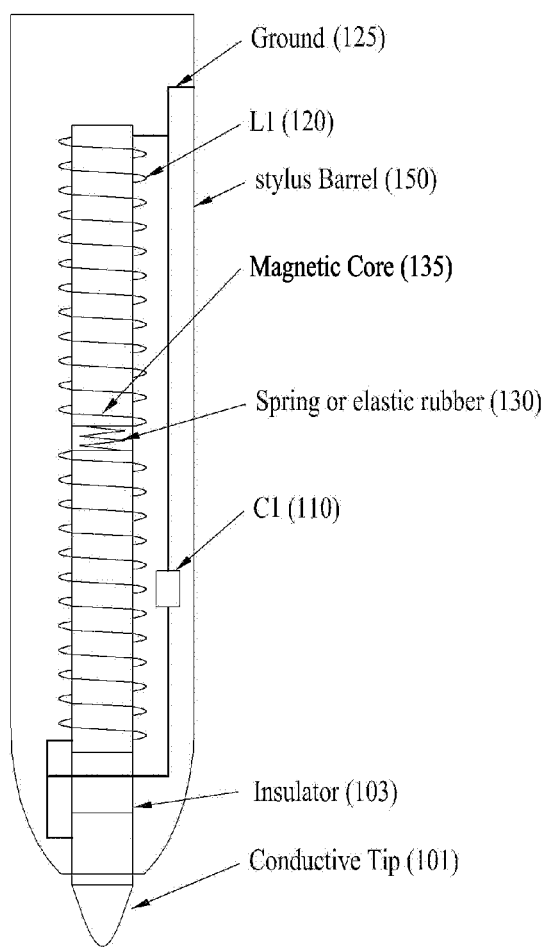
FIG. 8B is a diagram illustrating the structure of the stylus of FIG. 8A.

FIG. 8A is another circuit diagram corresponding to the stylus 100 of FIG. 6. FIG. 8B is a diagram illustrating the structure of the stylus 100 of FIG. 8A.

Referring to FIGS. 8A and 8B, the stylus 100 includes a plurality of primary coils L1A and L1B 120a and 120b connected in series to each other, a resonance capacitor C2 110 that is connected in parallel to the primary coils L1A and L1B 120a and 120b connected in series to each other, and a conductive tip 101 connected to the primary coil L1B 120b.

One side of the primary coils L1A and L1B 120a and 120b connected in series to each other and the resonance capacitor C2 110 connected in parallel to the primary coils L1A and L1B 120a and 120b in the stylus 100 is connected to the conductive tip 101, and the other side is connected to the stylus barrel 150 formed of a nonconductive material for formation of the stylus 100 and is grounded. In some embodiments, when a user acts as the stylus ground 500, the other side is connected to the ground capacitor Ch corresponding to the human body. That is, the stylus 100 is also connected to the stylus ground 500 to stabilize an internal circuit of the stylus 100.

The antenna loop 410 receives inductance signals of the primary coils L1A and L1B 120a and 120b in the stylus 100 as the mutual inductance M12 induced between the antenna loop L2 410 and the primary coils L1A and L1B 120a and 120b when the stylus 100 comes into contact with a surface of the sensor panel. As described with reference to FIG. 6, the antenna loop 410 is formed to surround the edge of the sensor panel and includes pads formed at the two ends that are connected to the touch controller 300.

The primary coils L1A and L1B 120a and 120b and the resonance capacitor C1 110 included in the stylus 100 are configured to have appropriate values so as to electromagnetically resonate with a frequency of a signal input through the sensing capacitor Csx 250 of the sensor panel. In other words, the primary coils L1A and L1B 120a and 120b and the resonance capacitor C1 110 of the stylus 100 are configured to have appropriate values so as to electromagnetically resonate with a frequency of a signal input through the sensing capacitor Csx 250 formed via coupling with the touch sensor 200 of the sensor panel including the first and second channels Tx/Rx that cross each other. Here, the resonance frequency satisfies the condition $f=1/[2\pi*(L1*C1)^{0.5}]$), wherein L1 is an inductance of the primary coils 120a and 120b, and C1 is a capacitance of the resonance capacitor 110. In addition, the sensing capacitor Csx 250 is an imaginary element formed via capacitive coupling at a contact area when the conductive tip 101 of the stylus 100 touches the sensor panel 201, but not a physical device constituting the circuit.

A magnetic signal generated during electromagnetic resonance in the stylus 100 generates induced electromotive force in the secondary coil L2 410 corresponding to the antenna loop by the mutual inductance M12 between the primary coils L1A and L1B 120a and 120b and the antenna loop L2 410 formed in the sensor panel 201. The induced electromotive force is amplified through the amplifier 310 for amplifying a voltage difference between the two ends of the antenna loop 410, passes through the filter unit AFE 320 including a filter for removal of noise, and is converted into a digital signal through the converter ADC 330. Then, coordinates are extracted from the signal via an appropriate algorithm through the signal processor DSP 340, and then, coordinate data is transmitted to a host system.

As described above, the primary coils L1A and L1B 120a and 120b of the stylus 100 directly generates the induced electromotive force in the secondary coil L2 410 corresponding to an antenna coil by the mutual inductance M12 with the antenna loop L2 410, a magnetic coupling coefficient between the primary coils L1A and L1B 120a and 120b and the antenna loop L2 410 may not be reduced and considered. Thus, the stylus 100 may be slimmed and manufacturing costs may be reduced.

Comparing the stylus 100 of FIG. 8B and the stylus 100 of FIG. 7B, the stylus 100 of FIG. 8B and the stylus 100 of FIG. 7B is different only in that the primary coils L1A and L1B 120a and 120b of FIG. 8B are wound around different regions of the magnetic core 135, and thus, detailed description of the same components will not be given here. Hereinafter, the spring 130 may be further provided between the magnetic core 135 and the conductive tip 101, or between a plurality of magnetic cores 135. The spring 130 is pressed by a predetermined degree when the conductive tip 101 is pressed against the surface of the sensor panel. Thus, electromagnetic resonance occurs only when the conductive tip 101 is pressed against the surface of the sensor panel, thereby enabling input detection and writing pressure detection of the stylus 100. In addition, even if the stylus 100 is close to the sensor panel, the stylus 100 operates only when the stylus 100 is pressed by a predetermined degree. Thus, the stylus 100 may function as a switch for preventing malfunction. The magnetic signal generated during electromagnetic resonance is transmitted to the antenna loop 410 formed outside the edge of the sensor pane and functions as a kind of the secondary coil L2 410, and thus, a voltage difference between two ends of the antenna loop 410 is detected by the touch controller 300.

The stylus 100 of FIG. 8B is advantageous in that the primary coils L1A and L1B 120a and 120b do not interfere with each other, thereby reducing parasitic capacitive capacitance therebetween. In some embodiments, when parasitic capacitive capacitance is negligible, the stylus 100 of FIG. 8B can be selected as long as sensitivity is not reduced due to the parasitic capacitive capacitance.

Figure 9:
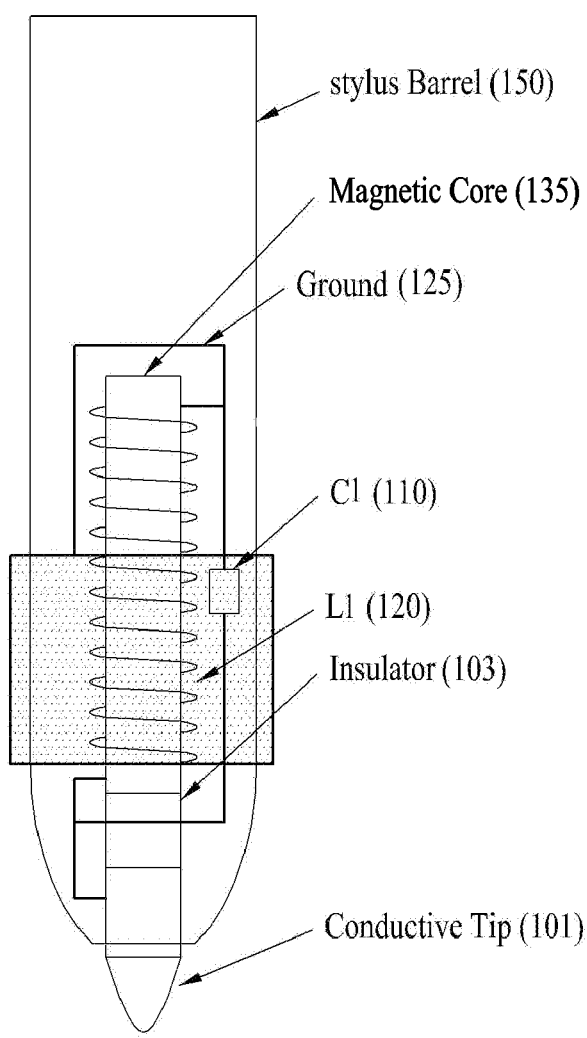
FIG. 9 is another diagram illustrating the structure of the stylus of FIG. 7A.
Figure 10:
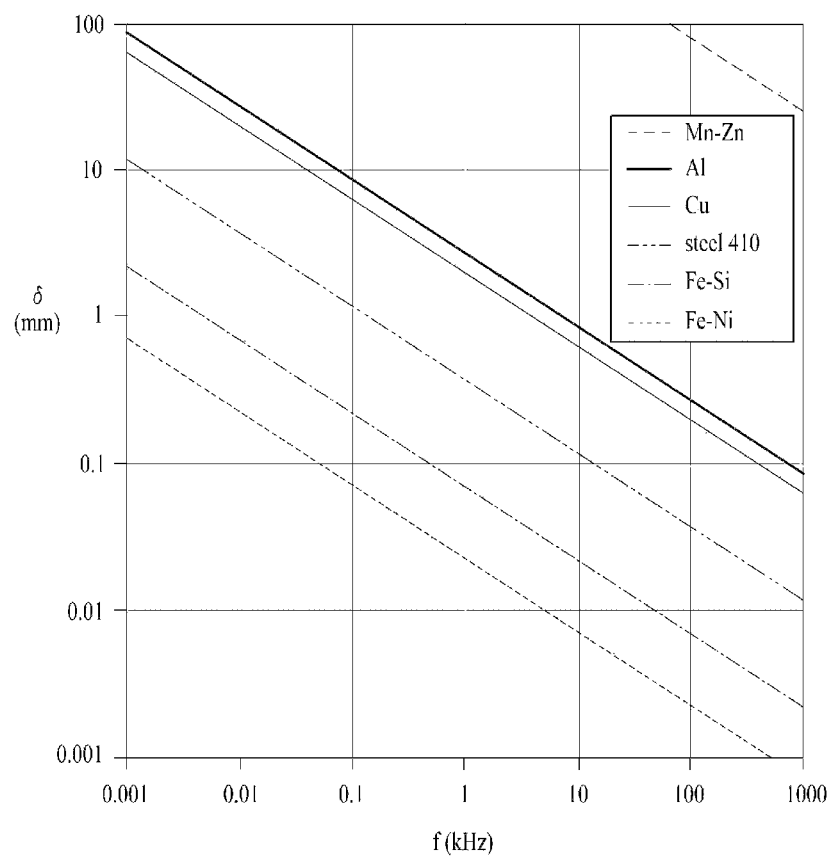
FIG. 10 is a graph illustrating conductivity properties of a conductive grip illustrated in FIG. 9 according to a material thereof.

FIG. 9 is another diagram illustrating the structure of the stylus 100 of FIG. 7A. FIG. 10 is a graph illustrating conductivity properties of a conductive grip 117 illustrated in FIG. 9 according to a material thereof.

The structure of the stylus 100 will now be described with reference to FIG. 9. The primary coil L1 120 included in the stylus 100 is wound about the magnetic core 135 disposed in an axis direction of the stylus 100. Here, one end of the primary coil L1 120 is connected to the conductive tip 101 and the other end is connected to the conductive grip 117 of the stylus barrel 150.

The conductive grip 117 is formed on a handle that the user holds and functions as a ground. The conductive grip 117 may be formed of a high resistance conductive material (e.g., conductive plastic and conductive graphite) to be described with reference to FIG. 10. When the conductive grip 117 is formed of a high resistance conductive material, transmittance of a magnetic signal may be remarkably increased compared with a metallic material. Thus, in this case, attenuation in a magnetic signal may be reduced such that the antenna 400 also receives the magnetic signal. In this case, the conductive tip 101 may also be formed of a high resistance conductive material so as to easily transmit a magnetic field.

The stylus 100 of FIG. 9 has a technical feature in that the other end of the primary coil L1 120 is connected to the conductive grip 117 formed of a high resistance conductive material. In addition, a contact structure between the stylus barrel 150 and the stylus ground 500 and an operation of the stylus 100 of FIG. 9 are the same as those of the stylus 100 of 7B. Thus, the structure and the operation of the stylus 100 of FIG. 9 can be understood with reference to the detailed description related to FIG. 7B.

Figure 11:
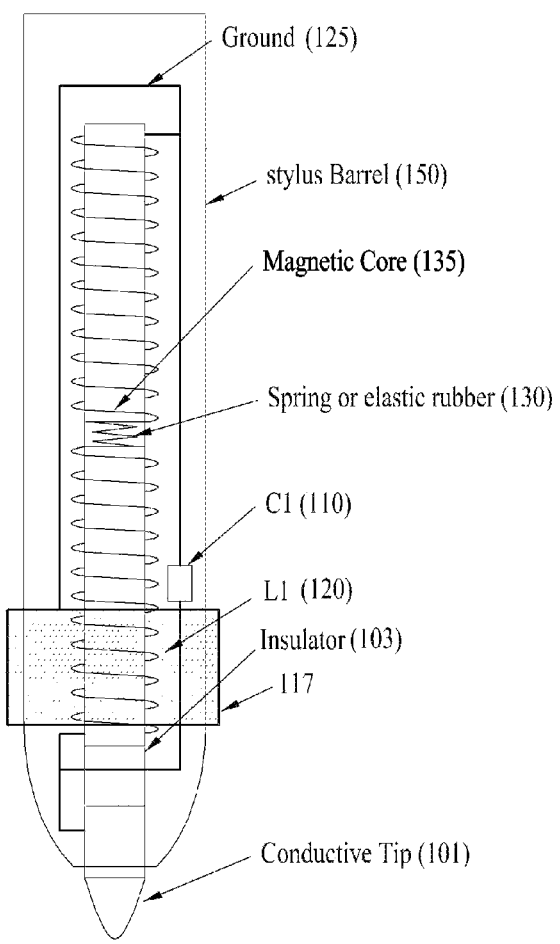
FIG. 11 is another diagram illustrating the structure of the stylus of FIG. 8A.

FIG. 11 is another diagram illustrating the structure of the stylus 100 of FIG. 8A.

The structure of the stylus 100 will now be described with reference to FIG. 11. The primary coils L1A and L1B 120a and 120b included in the stylus 100 are wound about the magnetic core 135 disposed in an axis direction of the stylus 100. Here, one end of the primary coil L1 120 is connected to the conductive tip 101 and the other end is connected to the conductive grip 117 of the stylus barrel 150.

As described above, the conductive grip 117 is formed on a handle that the user holds and functions as a ground. The conductive grip 117 may be formed of a high resistance conductive material (e.g., conductive plastic and conductive graphite) to be described with reference to FIG. 10. When the conductive grip 117 is formed of a high resistance conductive material, transmittance of a magnetic signal may be remarkably increased compared with a metallic material. Thus, in this case, attenuation in a magnetic signal may be reduced such that the antenna 400 also receives the magnetic signal. In this case, the conductive tip 101 may also be formed of a high resistance conductive material so as to easily transmit a magnetic field.

The stylus 100 of FIG. 11 has a technical feature in that the other end of the primary coil L1 120 is connected to the conductive grip 117 formed of a high resistance conductive material. In addition, a contact structure between the stylus barrel 150 and the stylus ground 500 and an operation of the stylus 100 of FIG. 9 are the same as those of the stylus 100 of FIG. 8B. Thus, the structure and the operation of the stylus 100 of FIG. 11 can be understood with reference to the detailed description related to FIG. 8B.

Figure 12A:
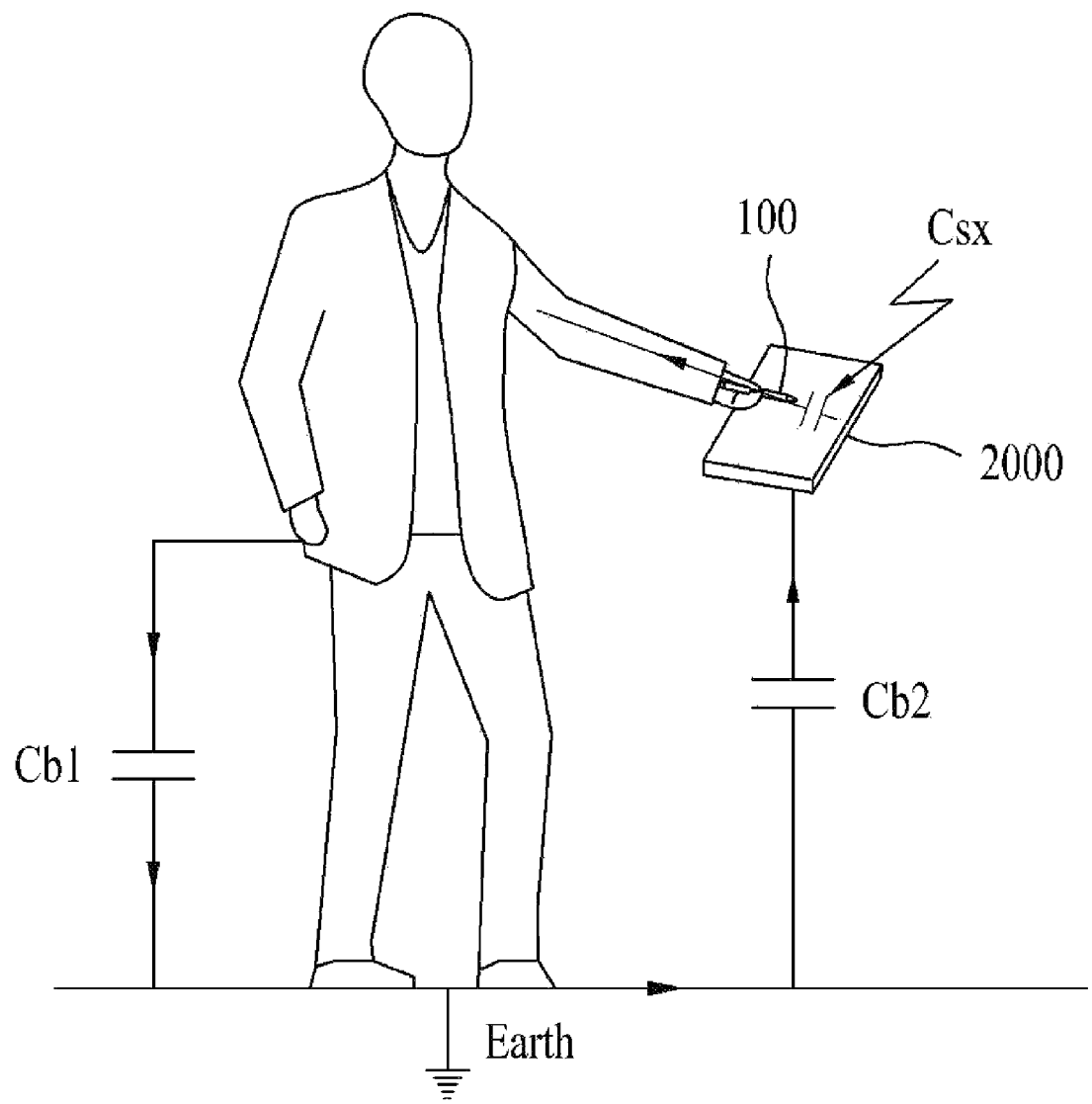
FIGS. 12A and 12B illustrates a grounding method of an input system according to embodiments of the present invention.
Figure 12B:
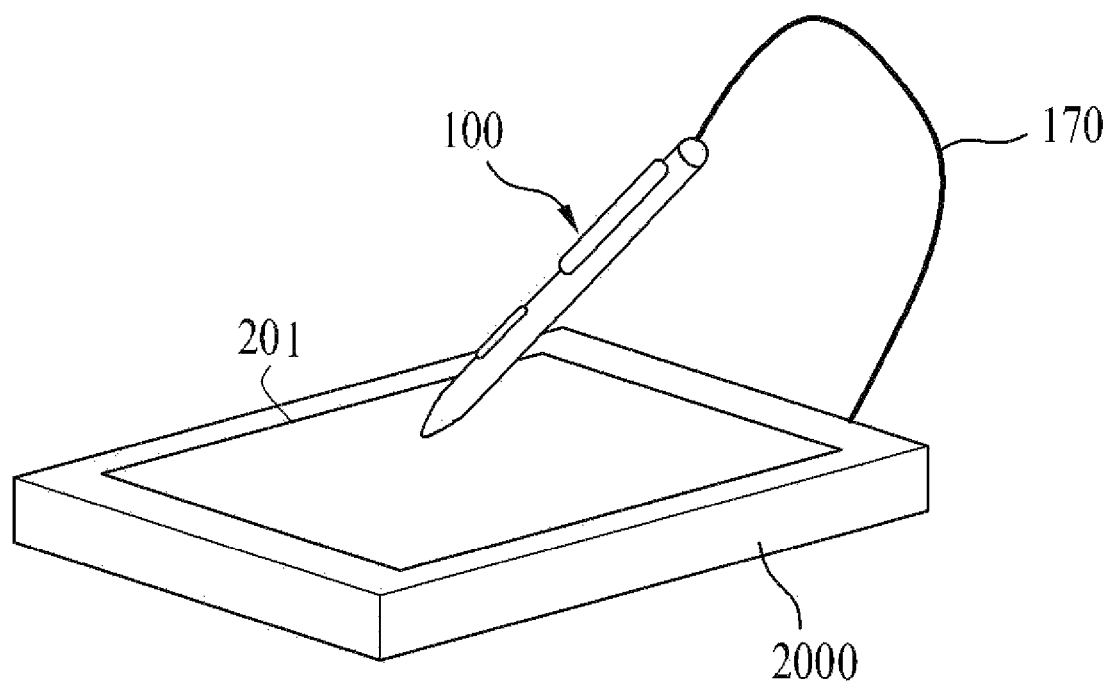

FIGS. 12A and 12B illustrates a grounding method of an input system according to embodiments of the present invention.

FIG. 12A illustrates grounding via a human body and the stylus barrel 150 of the stylus 100, as described above.

As illustrated in FIG. 12A, in case of grounding via a human body (a user), a display device 2000 including the sensor panel 201 and the human body are coupled to the earth via capacitances Cb1 and Cb2, respectively. When the user holds the display device 2000 with another hand, the capacitance Cb2 is strongly coupled to the earth through another hand and the human body to form a closed circuit for transmitting an AC signal.

Here, the display device 2000 refers to a display panel including the sensor panel 201. Examples of the display panel may include a liquid crystal display panel, an organic light emitting display panel, a plasma display panel, a quantum dot display panel, an electrophoretic display panel, and so on. Here, in some embodiments, the panel may further include a light source, and in this case, may further include a separate case unit.

In addition, the sensor panel 201 may be attached to the display device 2000, formed together with a panel surface of the display device in an array process, or formed in the panel.

Alternatively, in case of a wireless stylus, the wireless stylus is grounded via the human body through the structure illustrated in FIG. 9A.

FIG. 12B illustrates a wired stylus, ground of which is connected directly to a touch controller of the display device 2000 to which the sensor panel 201 is attached through a wire 170. In this case, the stylus 100 and the sensor panel 201 are physically connected through the wire 170.

Figure 13:
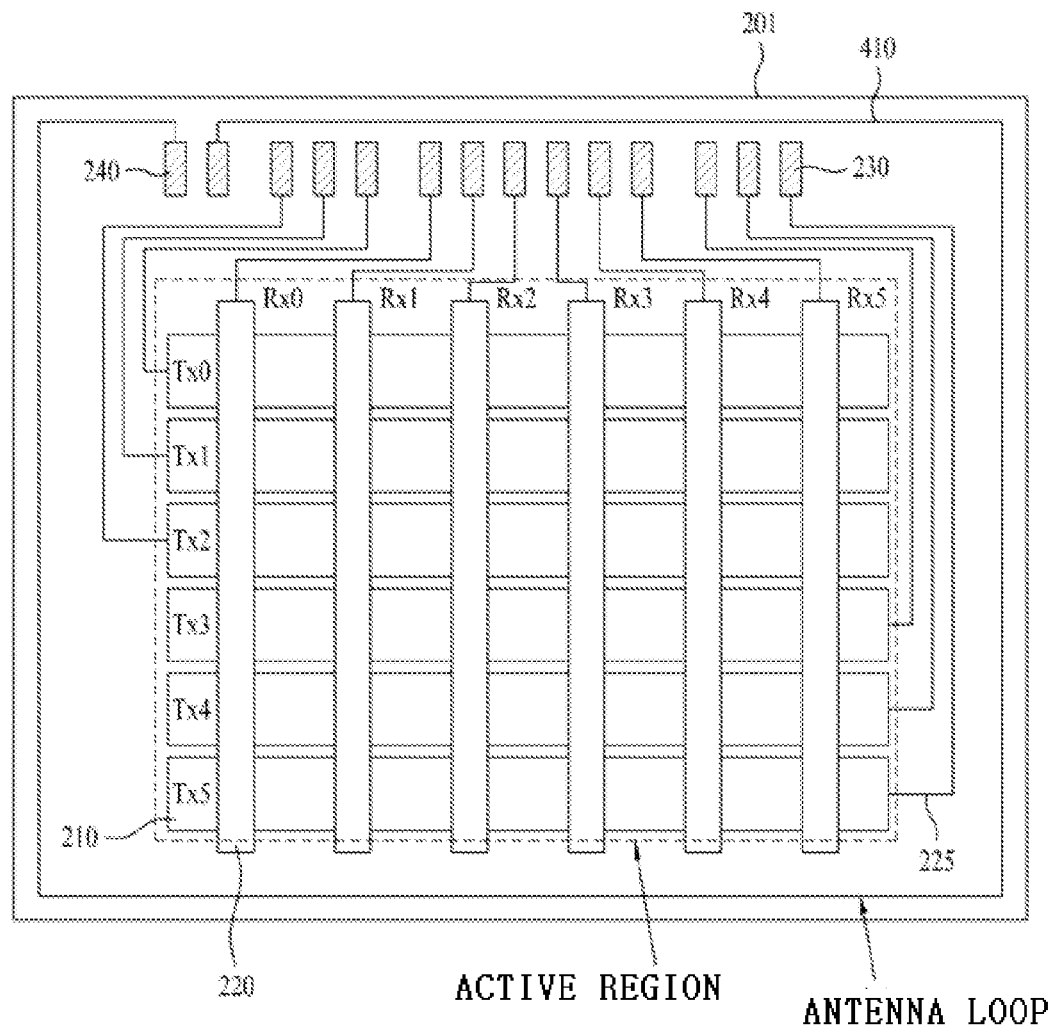
FIG. 13 is a plan view of a sensor panel of a touch input system according to the present invention.

FIG. 13 is a plan view of the sensor panel 201 of the touch input system according to the present invention.

As illustrated in FIG. 13, the sensor panel 201 of the touch input system according to the present invention is broadly divided into an active region and an edge region.

A plurality of first channels Tx 210 and a plurality of second channels Rx 220 are each shaped like a bar and cross each other in the active region. FIG. 13 illustrates bar-shape channels. In some cases, the shapes of the first channels Tx 210 and second channels Rx 220 may be changed in various forms of patterns using a capacitive manner.

For example, the first channels Tx 210 and the second channels Rx 220 may have a diamond shape or other polygonal shapes. In all cases, in the touch input system according to the present invention, the first channels Tx 210 and the second channels Rx 220 are each required to have a symmetrical shape in any directions of up, down, right, and left directions from a center for accuracy of stylus touch.

In order to receive a resonance signal generated from a resonance signal of the stylus 100, the antenna loop 410 is formed outside the edge region of the sensor panel 201. The antenna loop 410 is formed to be wider than the active region in which stylus input and coordinate extraction are actually performed, if possible, in order to prevent edge effect. Here, according to the edge effect, when touch using the stylus 100 is detected, if a channel has an asymmetric shape, the accuracy of coordinate extraction is reduced at an edge of the sensor panel 201.

The antenna loop 410 is a kind of a tertiary coil that induces inductance and does not include a separate magnetic core having a physical shape. Here, the antenna loop 410 may be a coil that operates using an air core between the antenna loop 410 and the stylus 100, as a medium.

The first channel Tx 210 and the second channel Rx 220 may be formed as transparent electrodes for transmitting light in the display device. In addition, the first channel Tx 210 of finger touch area is used to apply a drive signal and the second channel Rx 220 is used to receive a detect signal. The first channel Tx 210 and the second channel Rx 220 are electrically connected to each other through pads 230 and routing wires 225, respectively, which are formed outside the edge of the sensor panel 201.

In addition, loop pads 240 formed in parallel to the pads 230 formed outside one edge of the sensor panel 201 may be formed at two ends of the antenna loop 410. A voltage difference between the loop pads 240 can be detected by the touch controller.

The antenna loop 410 may be simultaneously formed with the routing wires 225 via the same process. Alternatively, in order to improve electromagnetic induction of the antenna loop 410, the sensor panel may further include a planar magnetic core in sheet form, which contacts the antenna loop 410.

Figure 14:
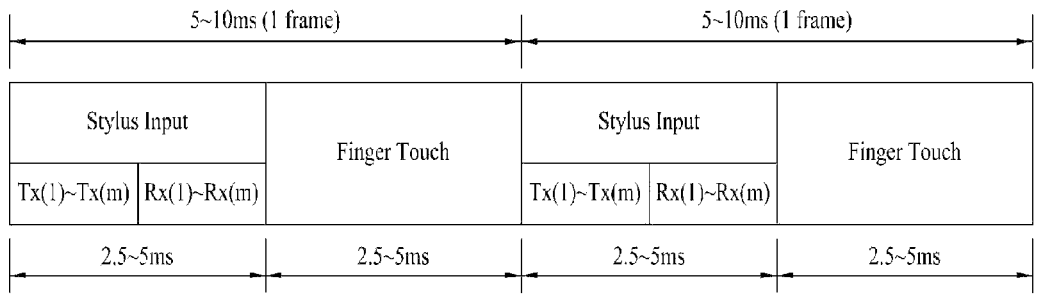
FIG. 14 is a diagram illustrating a frame driving method of a touch input system according to the present invention.

FIG. 14 is a diagram illustrating a frame driving method of the touch input system according to the present invention.

As illustrated in FIG. 14, the touch input system according to the present invention divides one frame into a stylus touch detection frame and a finger touch detection frame and time-division-drives the stylus touch detection frame and the finger touch detection frame. In addition, the stylus touch detection frame and the finger touch detection frame are alternately driven.

For example, when one frame corresponds to 5 to 10 ms, a frame rate corresponds to 100 to 200 Hz. In this case, when one frame is divided into the stylus touch detection frame and the finger touch detection frame, an allocated period of each of the stylus touch detection frame and the finger touch detection frame corresponds to 2.5 ms to 5 ms. This case corresponds to a case in which one frame is equally divided into the stylus touch detection frame and the finger touch detection frame. In some embodiments, it may be possible to adjust the stylus touch detection frame and the finger touch detection frame such that one thereof is longer than the other in one frame.

When stylus touch is detected, if the number of first channels Tx and the number of second channels Rx are m and n, respectively, as illustrated in FIG. 13, the m channels Tx(1) to Tx(m) of the first channels Tx and the n channels Rx(1) to Rx(n) of the second channels Rx are sequentially driven and sensed.

That is, a total 'm+n' of channels are sequentially driven in the stylus touch detection frame. Thus, for example, on the assumption that 'm'n'=50, time to drive one channel is 50 μs to 100 μs that is obtained by dividing 2.5 ms to 5 ms by 50.

In addition, when finger touch is detected, a change based on the touch is detected so as to detect a touch position by sequentially applying drive signals to the first channels Tx and sensing detect signals from the second channels Rx. Since the drive signals are applied to the first channels Tx only during detection of the finger touch, time (2.5 ms to 5 ms/m) to apply the driving signals of the first channels Tx during detection of the finger touch may be longer than time (2.5 ms to 5 ms/(m+n)) to apply signal to each channel during detection of the stylus touch.

In this case, waveforms of the drive signal and sensing signal of each channel are formed in such a way that the stylus input and the finger touch are alternately time-division-driven, as described below.

Hereinafter, a method of driving and sensing each channel for detection of stylus touch will be described.

Figure 15A:
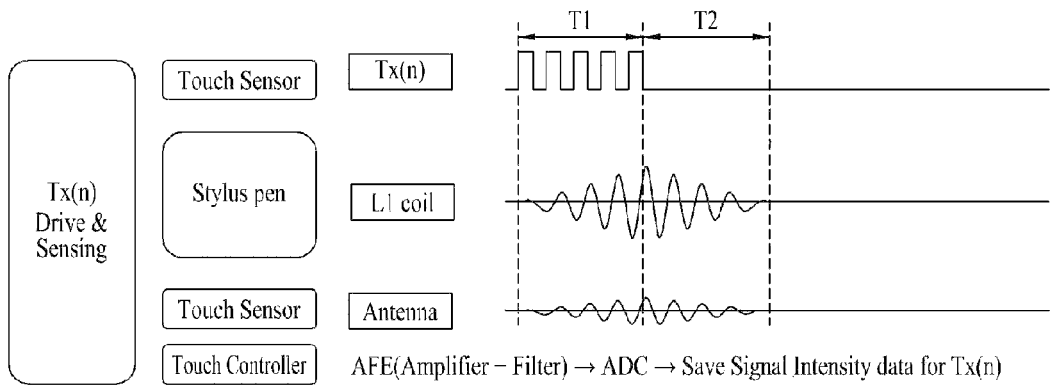
FIGS. 15A and 15B illustrate waveforms detected from a touch sensor panel and a stylus in a touch detection method of a touch input system according to the present invention.
Figure 15B:
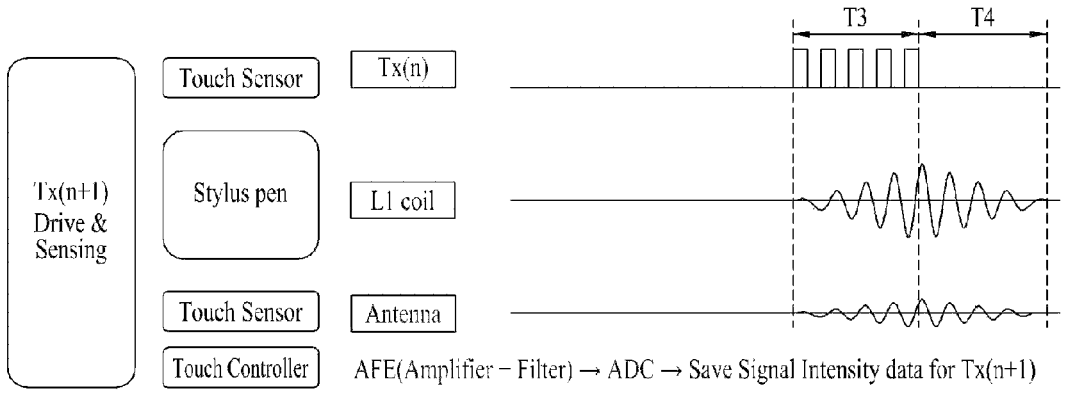

FIGS. 15A and 15B illustrate waveforms detected from a touch sensor panel and a stylus in a touch detection method of the touch input system according to the present invention.

Driving and sensing processes of two adjacent first channels Tx(n) and Tx(n+1) of the touch input system according to the present invention will now be described with reference to FIGS. 15A and 15B.

Although FIGS. 15A and 15B illustrate the driving process of the channels Tx(n) and Tx(n+1), the driving processes may be performed in the same manner by sequentially applying signals to the channels Tx(1) to Tx(m) and Rx(1) to Rx(n) in the order stated and detecting touch based on a voltage difference between two ends of the antenna loop 410 per channel.

Touch detection is performed by electrically connecting the sensing capacitor Csx between the conductive tip 101 and the sensor panel 201 to the primary coil L1 120, forming a resonance circuit of the primary coil L1 120 and the resonance capacitor C2, and receiving induced electromotive force that electromagnetically resonates in the antenna loop 410 due to mutual inductance M12 between the primary coil L1 120 and the antenna loop.

Likewise, since the primary coil L1 120 of the stylus 100 directly generates the induced electromotive force in the secondary coil L2 410 corresponding to an antenna coil by the mutual inductance M12 with the antenna loop L2 410, a magnetic coupling coefficient between the primary coil L1 120 and the antenna loop L2 410 may not be reduced and considered. Thus, the stylus 100 may be slimmed and manufacturing costs may be reduced.

The signals applied to the first and second channels Tx(1) to Tx(m) and Rx(1) to Rx(n) may apply a square wave or a sine wave at the same frequency as a resonance frequency, as illustrated in FIG. 15A.

A stylus may be grounded by a user when the stylus touches a surface of the sensor panel. Here, the stylus may be grounded by direct contact between a nonconductive barrel and the sensor panel or contact between the nonconductive barrel and the sensor panel through a wire.

As illustrated in FIG. 15A, when the channel Tx(n) is driven, a square wave or sine square at a predetermined frequency is applied to the channel Tx(n) from a touch controller for time T1. In addition, only signals received from the circuit and the antenna loop may be sensed without applying a signal to the channel Tx(n) for time T2.

That is, when a square wave or a sine wave is applied to the channel Tx(n), the sensing capacitor Csx generated via capacitive coupling between the Tx channel and a conductive tip is formed between the primary coil L1 120 of the stylus and the Tx channel, and the sensing capacitor Csx is electrically connected to the conductive tip when the stylus touches the surface of the sensor panel. Here, the signal of the primary coil L1 120 has a waveform that increases over time within time T1. This is because the amplitude of the signals increases over time as the primary coil L1 120 connected in series to resonance capacitor C1 110 in the resonance circuit of the closed circuit electromagnetically resonates with a resonance frequency.

When the stylus touches the sensor panel, the primary coil L1 120 is coupled to the antenna loop included in the sensor panel via the mutual inductance M12. Thus, the antenna loop can sense an electromagnetic signal generated by resonance of the stylus.

Signal intensity digital data about a voltage difference between two ends of the antenna loop corresponding to the corresponding channel is stored by detecting the received voltage difference between the two ends of the antenna loop, amplifying the voltage difference, removing noise of the amplified voltage difference, converting the amplified voltage difference, from which the noise is removed, from an analog signal into a digital signal, and storing the digital signal in a memory.

Then, as illustrated in FIG. 15B, with regard to the channel Tx(n+1), a drive signal is applied and sensing (touch detection) is performed for time T3 and time T4. Then, digital data corresponding to the signal is stored in the memory.

When signal intensity digital data about all channels of one frame is collected through the aforementioned process, coordinates corresponding to a stylus position are extracted by a signal processor of the touch controller.

As illustrated in the drawings, the signal of the stylus is applied for time T1 only, and thus, a separate sufficient sensing period may be provided. Alternatively, the signal application and the sensing may be simultaneously performed for time T1+T2. These methods have both advantages and disadvantages. When the signal is received for time T1+T2, time to receive the signal may be increased, thereby increasing the accuracy of the measured signal. However, the channel Tx or Rx is driven for time T1 and a parasitic loop including the channel Tx or Rx may cause a magnetic signal that acts as noise in the antenna loop. The noise may be received by the antenna loop together with signals generated from the resonance circuit of the stylus.

Thus, when it is difficult to accurately detect touch due to magnetic interference caused by the parasitic loop, the touch may be detected by detecting the resonance signal of the stylus in time T2 only. In this case, since the resonance signal is not received for time T1, time to receive signals and data accuracy may be reduced, but the magnetic noise does not affect the antenna loop.

Whether stylus touch can be detected is checked via simulation using the touch input system according to the present invention.

Figure 16A:
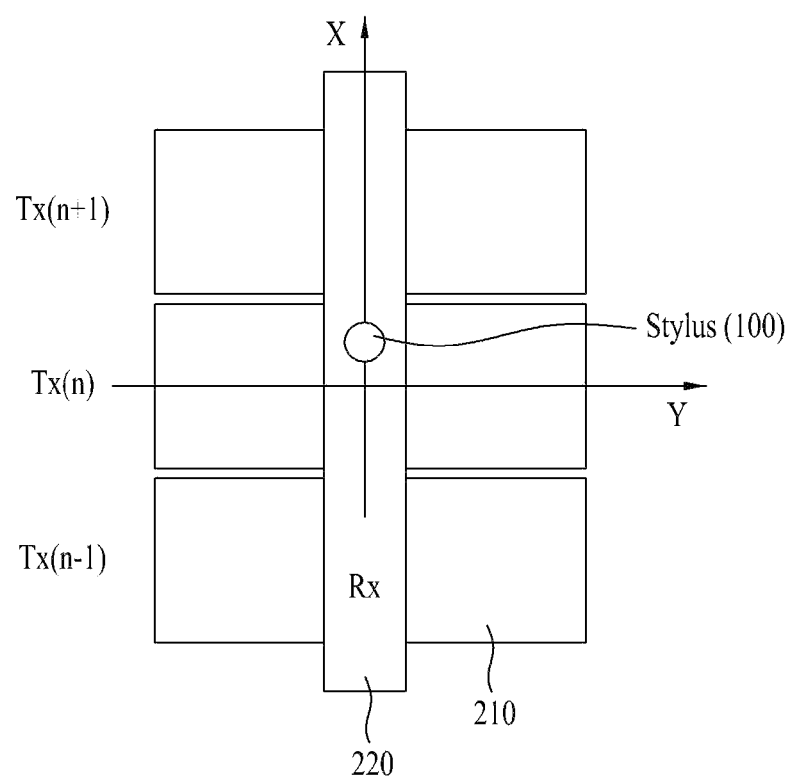
FIG. 16A is a portion for testing signal intensity of a touch input system according to the present invention.
Figure 16B:
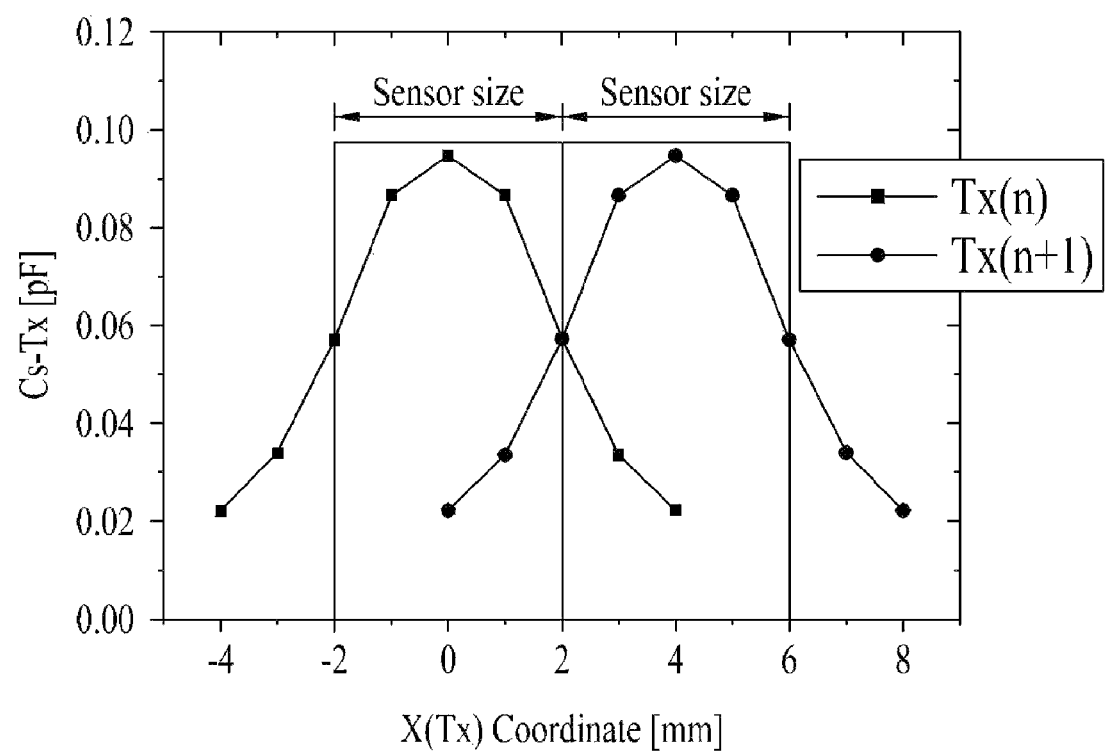
FIG. 16B is a simulation diagram illustrating variation in capacitance Csx according to movement in the X-axis direction.

FIG. 16A is a portion for testing signal intensity of the touch input system according to the present invention. FIG. 16B is a simulation diagram illustrating variation in capacitance Csx according to movement in the X-axis direction.

FIG. 16A illustrates the capacitance Csx of a sensing capacitor between the channels Tx(n) and Tx(n+1) and the conductive tip of the stylus 100 when the stylus 100 is positioned at a point 0 on the Y-axis and a coordinate of the X-axis is changed, the capacitance Csx, which is obtained via the simulation of FIG. 16B.

As seen from FIGS. 16A and 16B, the capacitance Csx of the sensing capacitor is highest at a center of the channel Tx and is reduced away from the center.

When the stylus 100 is positioned in the middle of the channels Tx(n) and Tx(n+1), the sensing capacitance Csx of the Tx(n) is the same as sensing capacitance Csx(n+1) of the channel Tx(n+1). That is, Csx(n)=Csx(n+1) is satisfied.

As seen from FIGS. 16A and 16B, when the stylus 100 is close to the channel Tx(n+1) compared with the channel Tx(n), the sensing capacitance Csx(n+1) coupled to the channel Tx(n+1) is larger than the sensing capacitance Csx coupled to the Tx(n). That is, Csx(n)<Csx(n+1) is satisfied. Thus, a signal proportional to sensing capacitance coupled to each channel Tx may be generated and sensed to obtain analog data represented with signal intensity required to extract a stylus position.

Figure 17A:
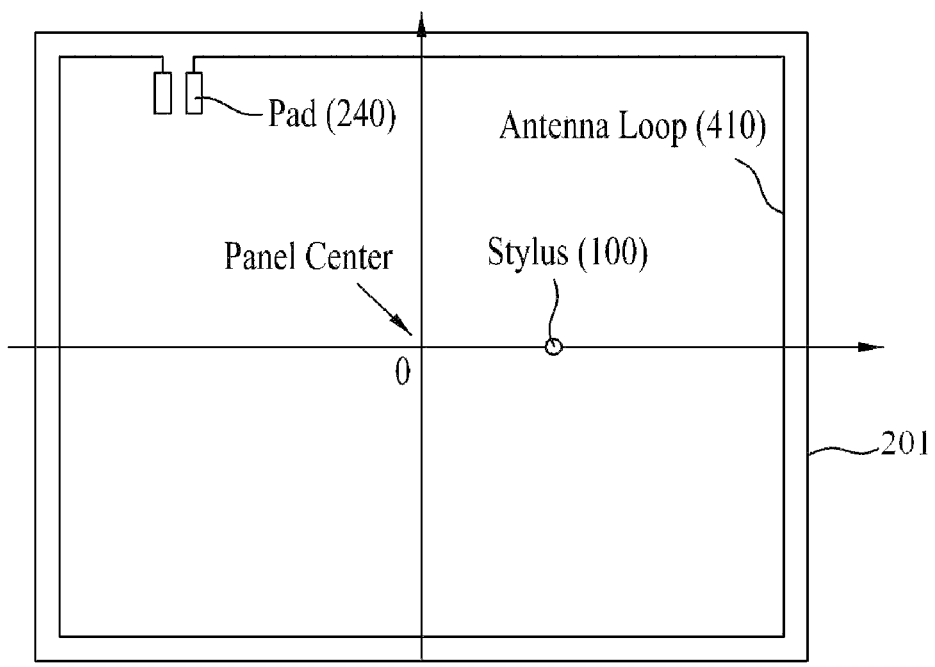
FIG. 17A is a diagram illustrating a touch panel of a touch input system according to the present invention and an antenna loop included in the touch panel.
Figure 17B:
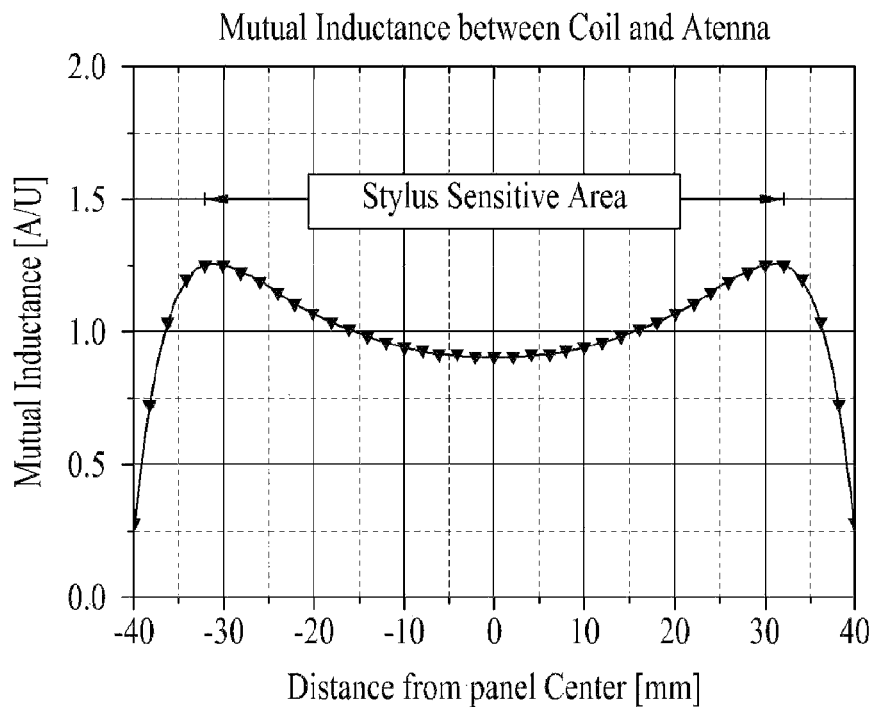
FIG. 17B is a graph illustrating mutual inductance when the stylus is moved along the X-axis of FIG. 17A

FIG. 17A is a diagram illustrating a touch panel of the touch input system according to the present invention and an antenna loop included in the touch panel. FIG. 17B is a graph illustrating mutual inductance when the stylus is moved along the X-axis of FIG. 17A.

As illustrated in FIG. 17A, when a center of the sensor panel 201 is determined a point 0 and a horizontal axis and a vertical axis are determined as an X-axis and a Y-axis, respectively, if the stylus 100 is moved along the X-axis, the mutual inductance M12 between the primary coil L1 120 of the stylus, generating a magnetic signal, and the antenna loop L2 410 of the sensor panel 201, and receiving the magnetic signal, is simulated. In this case, as seen from FIG. 17B, the mutual inductance M12 is slowly changed within a range of 0.5 A.U. to 1.5 A.U. at a central portion (i.e., an active region) of the antenna loop and is abruptly changed and reduced around an edge of the antenna loop, which is called edge effect. In this case, the active region where the first and second channels are arranged may be designed to correspond to a region in which the mutual inductance M12 of FIG. 17B increases away from the point 0 to avoid the edge effect.

Figure 18A:
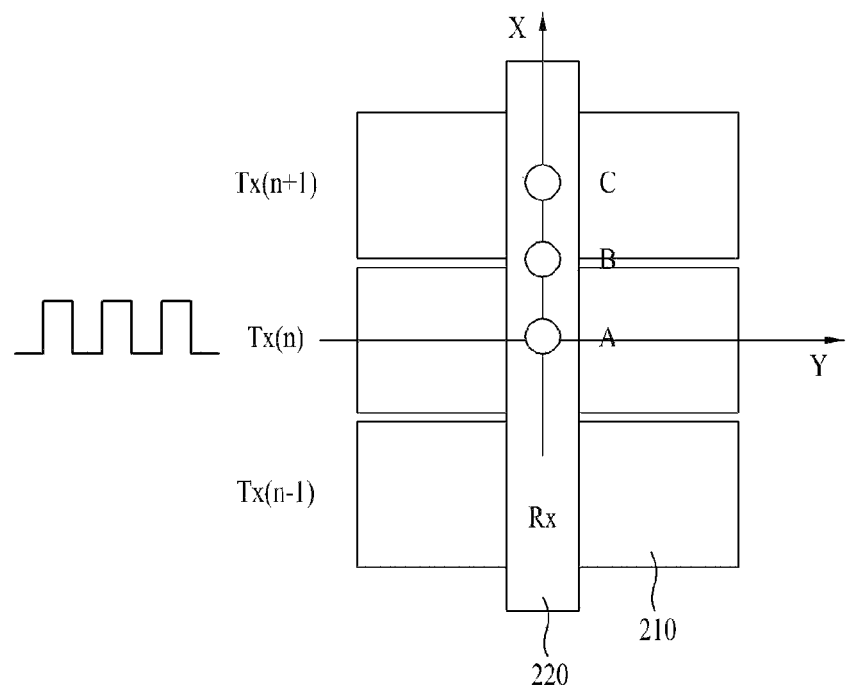
FIG. 18A illustrates a diagram illustrating states in which a stylus of a touch input system according to the present invention is positioned at points A, B, and C.
Figure 18B:
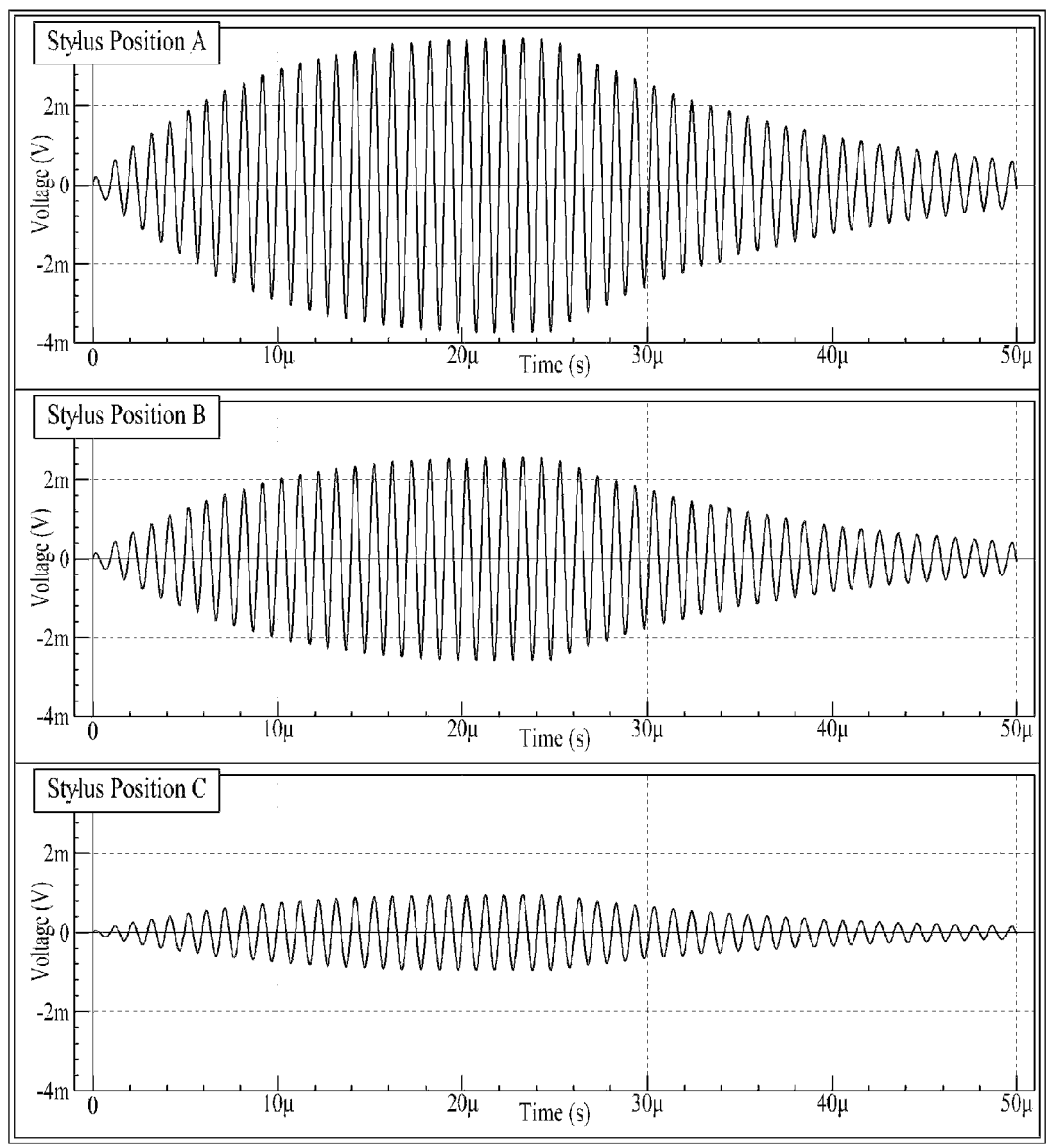
FIG. 18B illustrates waveforms of signals detected at the positions A, B, and C of the stylus of FIG. 15A.

FIG. 18A illustrates a diagram illustrating states in which the stylus of the touch input system according to the present invention is positioned at points A, B, and C. FIG. 18B illustrates waveforms of signals detected at the positions A, B, and C of the stylus of FIG. 15A.

As illustrated in FIG. 18A, when the stylus is positioned at the points A, B, and C along the X-axis (the vertical direction of FIG. 18A), drive signals are applied to the channel Tx(n). In this case, the waveforms of signals that are actually sensed from the antenna loop are illustrated in FIG. 18B.

As seen from FIGS. 18A and 18B, the waveform of the sensed signal has peak intensity when the stylus is positioned at the point A as the central portion of the channel Tx(n) to which the drive signals is applied, has an intermediate intensity when the stylus is positioned at the point B as a boundary region with an adjacent channel Tx(n−1), and has weakest intensity when the stylus is positioned at the point C as a central portion of the adjacent channel Tx(n−1). As the stylus is positioned close to a channel to which the drive signal is applied, the waveform of the sensed signal increases, and as the stylus is moved away from the channel to which the drive signal is applied, the waveform of the sensed signals decreases. Thus, it can be expected that the waveform is strongest at an actual touch point.

Analog signals applied to each channel are converted into digital signals via an ADC converter of a touch controller, and then, intensities of the signals are used to extract coordinates of the stylus using an appropriate algorithm via a signal processor.

That is, a channel with the strongest waveform may be detected to detect an actual stylus touch.

The touch input system according to the present invention and a touch detection method using the same have the following advantages.

That is, the touch input system can reduce manufacturing costs and simplify manufacturing processes compared with a system including separate respective panels for finger touch and stylus touch. In addition, the touch input system can implement a thin sensor panel.

Touch detection is possible via resonance between an internal resonance circuit of the stylus and an antenna loop of the sensor panel, and thus, the stylus does not require a battery, thereby reducing manufacturing costs compared with an active stylus that requires a separate power source. In addition, a light and small stylus can be implemented.

The stylus touch and the finger touch can be distinguished and sensed using different driving methods, and thus, palm rejection can be easily realized during the stylus touch, thereby improving the accuracy of touch sensitivity.

Sensing capacitance Csx generated between the stylus and one electrode, instead of mutual capacitance ΔCm between electrodes that cross each other and is used in a capacitive method, is used for touch detection, and relatively large sensing capacitance is used for stylus touch detection, and thus, improvement in sensitivity is expected.

A frequency signal of an internal resonance signal of the stylus is determined in synchronization with a drive signal applied to electrodes (channels) included in the sensor panel, a writing pressure detection function or a special button function can be easily implemented.

In addition, an antenna loop used for the stylus touch detection is spaced apart from an active region in which crossing electrodes are formed and formed outside an edge region with low sensitivity, and thus, sensitivity of the stylus can be maintained irrespective of regions.

The touch input system according to the present invention and a touch detection method using the same have the following effects.

First, the touch input system according to the present invention can detect finger touch via a basic structure for touch detection using a capacitive method, and detect stylus touch via resonance between an internal resonance circuit of the stylus and an antenna loop formed outside the edge of the sensor panel. That is, there is a limit in detecting stylus touch using a capacitive method, and thus, the stylus touch can be detected by changing the structure outside the edge of the sensor panel and an internal circuit of the stylus without a separate panel irrespective a contact area or shapes of electrode patterns.

Second, the resonance coil of the internal resonance circuit of the stylus is simplified to reduce a magnetic coupling coefficient according to the resonance coil, and thus, the thinned and small stylus can be manufactured, if possible, thereby reducing manufacturing costs.

Third, the touch input system can reduce manufacturing costs and simplify manufacturing processes compared with a system including separate respective panels for finger touch and stylus touch. In addition, the touch input system can implement a thin sensor panel.

Fourth, touch detection is possible via resonance between an internal resonance circuit of the stylus and an antenna loop of the sensor panel, and thus, a battery for the stylus is not required, thereby reducing manufacturing costs compared with an active stylus that requires a separate power source. In addition, a light and small stylus can be implemented.

Fifth, the stylus touch and the finger touch can be distinguished and sensed using different driving methods, and thus, palm rejection can be easily realized during the stylus touch, thereby improving the accuracy of touch sensitivity.

Sixth, sensing capacitance Csx generated between the stylus and one electrode, instead of mutual capacitance ΔCm between electrodes that cross each other and is used in a capacitive method, is used for touch detection, and relatively large sensing capacitance is used for stylus touch detection, and thus, improvement in sensitivity is expected.

Seventh, a frequency signal of an internal resonance signal of the stylus is determined in synchronization with a drive signal applied to electrodes (channels) included in the sensor panel, a writing pressure detection function or a special button function can be easily implemented.

Eighth, an antenna loop used for the stylus touch detection is spaced apart from an active region in which crossing electrodes are formed and formed outside an edge region with low sensitivity, and thus, sensitivity of the stylus can be maintained irrespective of regions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch input system comprising:
   a sensor panel comprising a plurality of first channels and a plurality of second channels crossing each other;
   a stylus comprising one or a plurality of primary coils connected in series to each other, a resonance capacitor connected in parallel to the primary coil, and a conductive tip connected to the primary coil;
   a ground connected to the stylus;
   an antenna loop formed outside an edge of the sensor panel; and
   a touch controller directly connected to the plurality of first channels, the plurality of second channels, and the antenna loop,
   wherein a sensing capacitor is formed at a contact area between the conductive tip and the sensor panel,
   wherein a drive signal is applied to each channel of the sensor panel from a drive signal generator of the touch controller, and a resonance circuit including the primary coil and the resonance capacitor of the stylus electromagnetically resonates with a same resonant frequency of the applied drive signal input through the sensing capacitor, and
   wherein the resonance frequency satisfies the condition: $f=1/[2\pi*(L1*C1)^{0.5}]$, where L1 is an inductance of the primary coil and C1 is a capacitance of the resonance capacitor, and
   wherein the touch controller includes an amplifier for amplifying a voltage difference between two ends of the antenna loop,
   a filter unit connected to the amplifier to remove noise,
   a converter connected to the filter unit to convert an analog signal into a digital signal,
   a signal processor connected to the converter to collect digital signal to extract coordinates, and
   the drive signal generator.

2. The touch input system according to claim 1, wherein the primary coil is wound about a magnetic core connected in series to the conductive tip and disposed in an axis direction of the stylus.

3. The touch input system according to claim 2, wherein the stylus comprises:
   a stylus barrel having a hole through which the conductive tip partially protrudes; and
   a grip formed on at least one outer circumference surface of the stylus barrel and formed of a high resistance conductive material.

4. The touch input system according to claim 3, wherein:
   one end of the primary coil disposed in series to the stylus is connected to the conductive tip; and
   the other end of the primary coil is connected to the stylus barrel or the grip formed of the high resistance conductive material.

5. The touch input system according to claim 2, wherein the antenna loop receives a resonating inductance signal from the primary coil in the stylus when the stylus touches a surface of the sensor panel.

6. A touch detection method using a touch input system comprising:
   a sensor panel comprising a plurality of first channels and a plurality of second channels crossing each other; a stylus comprising one or a plurality of primary coils connected in series to each other, a resonance capacitor connected in parallel to the primary coil, and a conductive tip connected to the primary coil; a ground connected to the stylus; and an antenna loop formed outside an edge of the sensor panel,
   wherein a sensing capacitor is formed at a contact area between the conductive tip and the sensor panel, wherein a drive signal is applied to each channel of the sensor panel from a drive signal generator of a touch controller directly connected to the plurality of first channels, the plurality of second channels, and the antenna loop, wherein a resonance circuit including the primary coil and the resonance capacitor of the stylus electromagnetically resonates with a same resonant frequency of the applied drive signal input through the sensing capacitor, and wherein the resonance frequency satisfies the condition:
   $f=1/[2\pi*(L1*C1)^{0.5}]$, where L1 is an inductance of the primary coil and C1 is a capacitance of the resonance capacitor,
   the method comprising time-division for performing finger touch sensing and stylus touch sensing per frame, and wherein the touch controller includes an amplifier for amplifying a voltage difference between two ends of the antenna loop, a filter unit connected to the amplifier to remove noise, a converter connected to the filter unit to convert an analog signal into a digital signal, a signal processor connected to the converter to collect digital signals to extract coordinates, and the drive signal generator.

7. The method according to claim 6, wherein the stylus touch sensing comprises sequentially applying signals to the plurality of first channels and the plurality second channels and detecting touch according to a voltage difference between the two ends of the antenna loop channel per channel.

8. The method according to claim 7, wherein the detecting of the touch comprises electrically connecting the sensing capacitor between the conductive tip and the sensor panel to at least one primary coil, forming the resonance circuit including the primary coil and the resonance capacitor, and receiving an induced electromotive force that electromagnetically resonates in the antenna loop due to the inductance of the primary coil.

9. The method according to claim 7, wherein the stylus comprises:

a stylus barrel having a hole through which the conductive tip partially protrudes; and a grip formed on at least one outer circumference surface of the stylus barrel and formed of a high resistance conductive material.

10. The method according to claim 9, wherein the antenna loop receives a resonating inductance signal from the primary coil in the stylus when the stylus touches a surface of the sensor panel.

\* \* \* \* \*